(12) United States Patent
Blank et al.

(10) Patent No.: US 10,694,668 B2
(45) Date of Patent: Jun. 30, 2020

(54) LOCALLY CONTROLLING SETTINGS ON A COMBINE HARVESTER BASED ON A REMOTE SETTINGS ADJUSTMENT

(71) Applicant: Deere & Company, Moline, IL (US)

(72) Inventors: Sebastian Blank, Bettendorf, IA (US); Bhanu Kiran Reddy Palla, Bettendorf, IA (US)

(73) Assignee: Deere & Company, Moline, IL (US)

( * ) Notice: Subject to any disclaimer, the term of this patent is extended or adjusted under 35 U.S.C. 154(b) by 216 days.

(21) Appl. No.: 15/626,972

(22) Filed: Jun. 19, 2017

(65) Prior Publication Data

US 2018/0359918 A1    Dec. 20, 2018

(51) Int. Cl.
| | |
|---|---|
| A01D 41/127 | (2006.01) |
| A01F 7/02 | (2006.01) |
| A01F 12/28 | (2006.01) |
| A01F 12/44 | (2006.01) |

(52) U.S. Cl.
CPC ........ *A01D 41/127* (2013.01); *A01D 41/1277* (2013.01); *A01F 7/02* (2013.01); *A01F 12/28* (2013.01); *A01F 12/444* (2013.01); *A01F 12/448* (2013.01)

(58) Field of Classification Search
None
See application file for complete search history.

(56) References Cited

U.S. PATENT DOCUMENTS

| | | | |
|---|---|---|---|
| 4,951,031 A | 8/1990 | Strubbe | |
| 5,585,757 A | 12/1996 | Frey | |
| 5,679,094 A | 10/1997 | Nakamura et al. | |
| 5,734,849 A | 3/1998 | Butcher | |
| 5,751,199 A | 5/1998 | Shiau et al. | |
| 5,755,281 A | 5/1998 | Kang et al. | |
| 6,449,932 B1 | 9/2002 | Cooper et al. | |
| 6,553,300 B2 | 4/2003 | Ma et al. | |
| 6,726,559 B2 | 4/2004 | Bischoff | |
| 6,990,459 B2 | 1/2006 | Schneider | |

(Continued)

FOREIGN PATENT DOCUMENTS

| | | |
|---|---|---|
| CN | 101622928 A | 1/2010 |
| DE | 10 2006 007 753 A1 | 10/2006 |

(Continued)

OTHER PUBLICATIONS

Final Office Action for U.S. Appl. No. 14/271,077 dated Jan. 25, 2018, 25 pages.

(Continued)

*Primary Examiner* — Thomas G Black
*Assistant Examiner* — Demetra R Smith-Stewart
(74) *Attorney, Agent, or Firm* — Joseph R. Kelly; Kelly, Holt & Christenson PLLC

(57) ABSTRACT

A display controller controls a display device in a harvester to display an interface showing adjustments to combine harvester settings, received from a remote computing system, along with an adjustment actuator. A settings adjustment is made based on user actuation of the adjustment actuator input is received through the settings adjustment actuator on the displayed interface. A verification notification is sent to the remote computing system, showing the adjusted settings on the combine.

20 Claims, 22 Drawing Sheets

(56) References Cited

U.S. PATENT DOCUMENTS

| | | |
|---|---|---|
| 6,999,877 B1 | 2/2006 | Dyer |
| 7,047,135 B2 | 5/2006 | Dyer |
| 7,164,992 B1 | 1/2007 | Mulligan et al. |
| 7,184,892 B1 | 2/2007 | Dyer |
| 7,333,922 B2 | 2/2008 | Cannon |
| 7,364,003 B2 | 4/2008 | Holt et al. |
| 7,397,392 B2 | 7/2008 | Mahoney et al. |
| 8,280,595 B2 | 10/2012 | Foster et al. |
| 8,469,784 B1 | 6/2013 | Hoskinson |
| 9,330,062 B2 | 5/2016 | Thurow et al. |
| 9,809,956 B1 * | 11/2017 | Sherlock ............. E02F 9/2054 |
| 9,892,376 B2 | 2/2018 | Pfeiffer |
| 10,310,450 B2 | 6/2019 | Caldwell et al. |
| 10,310,455 B2 | 6/2019 | Blank |
| 10,311,527 B2 | 6/2019 | Pfeiffer |
| 2002/0040300 A1 | 4/2002 | Ell |
| 2002/0103688 A1 | 8/2002 | Schneider |
| 2003/0014171 A1 | 1/2003 | Ma |
| 2003/0161906 A1 | 8/2003 | Braunhardt et al. |
| 2004/0024510 A1 * | 2/2004 | Finley ................. G05B 19/042 701/50 |
| 2005/0150202 A1 | 7/2005 | Quick |
| 2005/0171660 A1 | 8/2005 | Woolford et al. |
| 2005/0171835 A1 | 8/2005 | Mook et al. |
| 2005/0258259 A1 | 11/2005 | Stanimirovic |
| 2006/0187048 A1 | 8/2006 | Curkendall |
| 2006/0191692 A1 | 8/2006 | Holt et al. |
| 2006/0241838 A1 | 10/2006 | Mangiardo et al. |
| 2006/0287792 A1 | 12/2006 | Jarrett |
| 2006/0293913 A1 | 12/2006 | Iwig |
| 2007/0156318 A1 | 7/2007 | Anderson |
| 2007/0192173 A1 | 8/2007 | Moughler et al. |
| 2008/0319927 A1 | 12/2008 | Dellmier et al. |
| 2009/0036184 A1 | 2/2009 | Craessaerts et al. |
| 2009/0259483 A1 | 10/2009 | Hendrickson et al. |
| 2009/0312919 A1 | 12/2009 | Foster et al. |
| 2010/0036696 A1 | 2/2010 | Lang et al. |
| 2010/0071329 A1 | 3/2010 | Hindryckx |
| 2010/0153409 A1 | 6/2010 | Joshi |
| 2010/0199257 A1 | 8/2010 | Biggerstaff |
| 2010/0217481 A1 | 8/2010 | Baumgarten et al. |
| 2010/0217631 A1 | 8/2010 | Boss et al. |
| 2011/0251752 A1 | 10/2011 | DeLarocheliere et al. |
| 2011/0270495 A1 | 11/2011 | Knapp |
| 2012/0038544 A1 | 2/2012 | Chen |
| 2012/0151055 A1 | 6/2012 | Kansal |
| 2012/0215395 A1 | 8/2012 | Aznovorian |
| 2012/0253709 A1 | 10/2012 | Schmidt et al. |
| 2012/0253744 A1 | 10/2012 | Schmidt |
| 2012/0260366 A1 | 10/2012 | Heuvelmans |
| 2012/0323453 A1 | 12/2012 | Havimaki et al. |
| 2012/0323496 A1 | 12/2012 | Burroughs et al. |
| 2013/0317872 A1 | 11/2013 | Nakamichi |
| 2014/0019018 A1 | 1/2014 | Baumgarten |
| 2014/0025440 A1 | 1/2014 | Nagda et al. |
| 2014/0069035 A1 | 3/2014 | Collins et al. |
| 2014/0122147 A1 | 5/2014 | Christie |
| 2014/0129048 A1 | 5/2014 | Baumgarten et al. |
| 2014/0156105 A1 | 6/2014 | Faivre et al. |
| 2014/0172247 A1 | 6/2014 | Thomson |
| 2014/0188576 A1 | 7/2014 | de Oliveira et al. |
| 2014/0277905 A1 | 9/2014 | Anderson |
| 2015/0046043 A1 | 2/2015 | Bollin |
| 2015/0058641 A1 | 2/2015 | Parikh |
| 2015/0064668 A1 | 3/2015 | Manci et al. |
| 2015/0112546 A1 | 4/2015 | Ochsendorf et al. |
| 2015/0178661 A1 | 6/2015 | Keaveny et al. |
| 2015/0199360 A1 | 7/2015 | Pfeiffer |
| 2015/0199630 A1 | 7/2015 | Pfeiffer |
| 2015/0199775 A1 | 7/2015 | Pfeiffer |
| 2015/0366124 A1 * | 12/2015 | Kremmer ............... A01B 59/06 701/2 |
| 2016/0059412 A1 | 3/2016 | Oleynik |
| 2016/0078391 A1 | 3/2016 | Pfeiffer |
| 2016/0088793 A1 * | 3/2016 | Bischoff .............. A01D 41/127 460/1 |
| 2016/0098637 A1 | 4/2016 | Hodel et al. |
| 2016/0202227 A1 | 7/2016 | Mathur et al. |
| 2016/0212969 A1 | 7/2016 | Ouchida et al. |
| 2017/0090741 A1 * | 3/2017 | Tentinger ................. G06F 8/38 |
| 2017/0168501 A1 * | 6/2017 | Ogura .................. G05D 1/0278 |
| 2017/0261978 A1 * | 9/2017 | Gresch ................ A01B 69/008 |
| 2017/0322550 A1 * | 11/2017 | Yokoyama ........... A01B 63/111 |
| 2018/0196438 A1 * | 7/2018 | Newlin ................ G05D 1/0214 |
| 2018/0359917 A1 | 12/2018 | Pfeiffer |
| 2018/0359918 A1 | 12/2018 | Blank et al. |
| 2018/0359919 A1 | 12/2018 | Blank |
| 2018/0364652 A1 | 12/2018 | Blank |
| 2018/0364698 A1 | 12/2018 | Blank |
| 2019/0146426 A1 | 5/2019 | Blank |

FOREIGN PATENT DOCUMENTS

| | | |
|---|---|---|
| EP | 1111550 A1 | 6/2001 |
| EP | 1277388 A1 | 1/2003 |
| EP | 1714822 A2 | 10/2006 |
| EP | 1371278 B1 | 11/2008 |
| EP | 3093397 A1 | 11/2016 |
| EP | 3346347 A1 | 11/2018 |
| WO | 2013096716 A1 | 6/2013 |
| WO | 2013096721 A2 | 6/2013 |
| WO | 2015153809 A1 | 10/2015 |
| WO | 2016115496 A1 | 7/2016 |
| WO | 2016115499 A1 | 7/2016 |
| WO | 2016116499 A1 | 7/2016 |
| WO | 2016200699 A1 | 12/2016 |

OTHER PUBLICATIONS

U.S. Appl. No. 14/445,699 Office Action dated Mar. 30, 2018, 61 pages.

U.S. Appl. No. 14/271,077 Prosecution History as of Feb. 15, 2019, 195 pages.

U.S. Appl. No. 14/445,699, filed Jul. 20, 2014 Prosecution History as of Feb. 12, 2019, 290 pages.

U.S. Appl. No. 14/546,725, filed Nov. 18, 2014 Prosecution History as of Feb. 12, 2019, 313 pages.

U.S. Appl. No. 14/925,237, filed Oct. 28, 2015 Prosecution History as of Feb. 12, 2019, 232 pages.

U.S. Appl. No. 15/626,934, filed Jan. 18, 2017 Prosecution History as of Feb. 12, 2019, 151 pages.

U.S. Appl. No. 15/626,967, filed Jun. 19, 2017 Prosecution History as of Feb. 12, 2019, 162 pages.

U.S. Appl. No. 15/629,260, filed Jun. 21, 2017, Prosecution History as of Feb. 12, 2019, 64 pages.

U.S. Appl. No. 15/983,456, filed May 18, 2018 Prosecution History as of Feb. 12, 2019, 198 pages.

U.S. Appl. No. 16/246,818, filed Jan. 14, 2019 Prosecution History as of Feb. 12, 2019, 62 pages.

Combine Harvester Instrumentation System for Use in Precision Agriculture, Yap Kin 2011.

European Patent Application No. 18176691.6-1217 Extended European Search Report dated Oct. 25, 2018, 8 pages.

U.S. Appl. No. 14/271,077 Office Action dated Oct. 2, 2018, 10 pages.

U.S. Appl. No. 14/546,725 Office Action dated Oct. 11, 2018, 11 pages.

Extended European Search Report Application No. 18176687.4 dated Nov. 6, 2018, 6 pages.

U.S. Appl. No. 14/155,023, Prosecution History as of Oct. 10, 2017, 156 pages.

U.S. Appl. No. 14/271,077, filed Mar. 6, 2017, Prosecution History as of Oct. 10, 2017, 122 pages.

U.S. Appl. No. 14/445,699, filed Jul. 29, 2014, Prosecution History as of Oct. 11, 2017, 155 pages.

U.S. Appl. No. 14/546,725, filed Nov. 18, 2014, Prosecution History as of Oct. 11, 2017, 182 pages.

(56) References Cited

OTHER PUBLICATIONS

U.S. Appl. No. 14/925,237, filed Oct. 28, 2015, Prosecution History as of Oct. 11, 2017, 122 pages.
U.S. Appl. No. 15/626,934, filed Jun. 19, 2017, Application and Drawings, 68 pages.
U.S. Appl. No. 15/629,260, filed Jun. 21, 2017, Application and Drawings, 106 pages.
European Search Report Application No. 14879223.7 dated May 22, 2017, 7 pages.
Electronic Fleet Management for Work Truck Fleets, Jun. 20, 2013 2 pages. www.zonarsystems.com.
2013 Buyer's Guide Fleet Automation Software, http://www.teletrac.com/asseets/TT_BuyersGuide_2013.pdf, 10 pages.
International Search Report and Written Opinion for International Application No. PCT/US2014/069541, dated Apr. 15. 2015, date of filing: Dec. 10, 2014, 17 pages.
Fleet Management: How it works. 2014 Verizon. 3 pages.
U.S. Appl. No. 14/445,699 Office Action dated Jul. 20, 2018, 70 pages.
U.S. Appl. No. 14/445,699 Final Office Action dated Mar. 6, 2019, 66 pages.
U.S. Appl. No. 15/626,967 Notice of Allowance dated Jan. 3, 2019, 6 pages.
U.S. Appl. No. 15/626,967 Notice of Allowance dated Jun. 5, 2019, 14 pages.
U.S. Appl. No. 14/271,077 Notice of Allowance dated Jun. 19, 2019, 7 pages.
U.S. Appl. No. 15/626,934 Final Office Action dated Jul. 11, 2019, 34 pages.
European Search Report issued in counterpart European Patent Application No. 19173588.5 dated Oct. 7, 2019 (5 pages).
U.S. Appl. No. 15/983,456 Office Action dated Nov. 13, 2019, 16 pages.
U.S. Appl. No. 15/980,234, Office Action dated Nov. 5, 2019, 11 pages.
EP Application No. 14879223.7 Communication pursuant to Article 94(3) dated May 22, 2019, 6 pages.
Application and Drawings for U.S. Appl. No. 15/626,972 flied Jun. 19. 2017, 65 pages.
Non-Final Office Action for U.S. Appl. No. 15/983.456 dated Nov. 13 2019, 17 pages.
Non-Final Office Action tor U.S. Appl. No. 14/445,699 dated Jul. 20. 2018, 71 pages.
Restriction Requirement for U.S. Appl. No. 14/155,023 dated Mar. 30, 2016, 7 pages.
Notice of Allowance for U.S. Appl. No. 14/271,077 dated Jun. 19. 2019, 8 pages.
Prosecution History for U.S. Appl. No. 14/546,725 including: Notice of Allowance dated Apr. 2, 2019 and Advisory Action dated Jan. 22, 2019, 11 pages.
Prosecution History for U.S. Appl. No. 14/925,237 including Corrected Notice of Allowance dated Sep. 17, 2019, Corrected Notice of Allowance dated Sep. 6, 2019, and Notice of Allowance dated Jul. 30, 2019, 18 pages.
Final Office Action for U.S. Appl. No. 15/626,934 dated Jul. 11, 2016, 22 pages.
Notice of Allowance for U.S. Appl. No. 15/626.967 dated Jul. 17, 2019, 7 pages.
Notice of Allowance for U.S. Appl. No. 15/629,260 dated Apr. 9. 2019, 10 pages.
First Office Action for Chinese Patent Application No. 201480068108.2 dated Oct. 8, 2018 12 pages.
Search Report for German Patent Application No. 102018209843.3 dated Apr. 9, 2020. 12 pages.

\* cited by examiner

LOCALLY CONTROLLING SETTINGS ON A COMBINE HARVESTER BASED ON A REMOTE SETTINGS ADJUSTMENT

FIELD OF THE DESCRIPTION

The present description relates to a control interface for an agricultural machine. More specifically, the present description relates to a remote control interface for controlling settings on a combine harvester.

BACKGROUND

There are a wide variety of different types of equipment, such as construction equipment, turf care equipment, forestry equipment and agricultural equipment. These types of equipment that are operated by an operator. For instance, a combine harvester (or combine) is operated by an operator, and it has many different mechanisms that are controlled by the operator in performing a harvesting operation. The combine may have multiple different mechanical, electrical, hydraulic, pneumatic, electromechanical (and other) subsystems, some or all of which can be controlled, at least to some extent, by the operator. The systems may need the operator to make a manual adjustment outside the operator's compartment or to set a wide variety of different settings and provide various control inputs in order to control the combine. Some inputs not only include controlling the combine direction and speed, but also threshing clearance and sieve settings, rotor and fan speed settings, and a wide variety of other settings and control inputs.

Because of the complex nature of the combine operation, it can be very difficult to know how a particular operator or machine is performing in a given harvesting operation. While some systems are currently available that sense some operational and other characteristics, and make them available to reviewing personnel, those current systems are normally informational in nature.

The discussion above is merely provided for general background information and is not intended to be used as an aid in determining the scope of the claimed subject matter.

SUMMARY

A display controller controls a display device in a harvester to display an interface showing adjustments to combine harvester settings, received from a remote computing system, along with an adjustment actuator. A settings adjustment is made based on user actuation of the adjustment actuator input is received through the settings adjustment actuator on the displayed interface. A verification notification is sent to the remote computing system, showing the adjusted settings on the combine.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
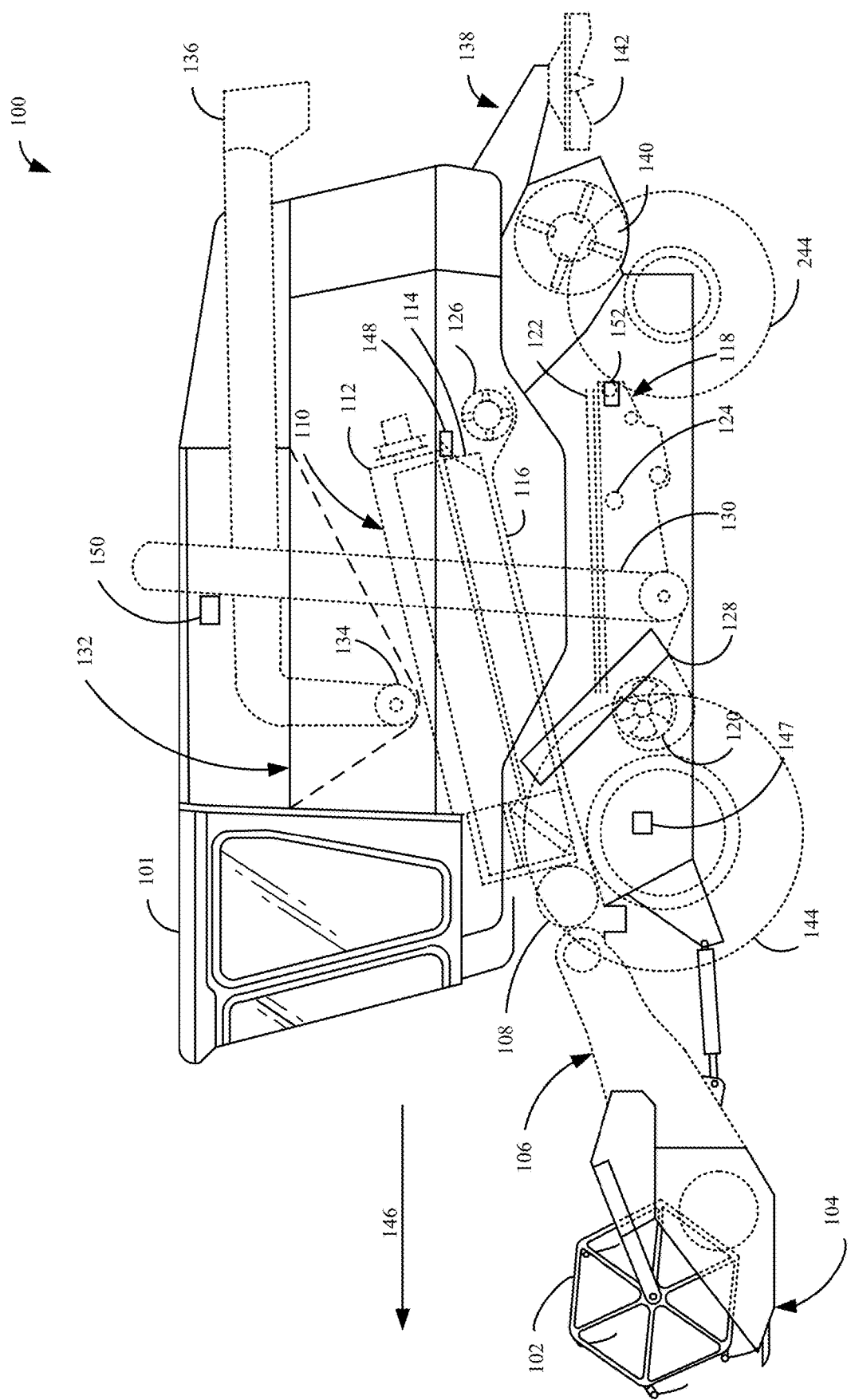
FIG. 1 is a partial pictorial, partial schematic illustration of a combine harvester.

Combine harvesters often have a wide variety of sensors that sense a variety of different variables, such as operating parameters, along with crop characteristics, environmental parameters, etc. The sensors can communicate this information over a controller area network (CAN) bus (or another network, such as an Ethernet network, etc.) to various systems that can process the sensor signals and generate output signals (such as control signals) based on the sensed variables. Given the complex nature of the control operations needed to operate a combine harvester, and given the wide variety of different types of settings and adjustments that an operator can make, and further given the widely varying different types of crops, terrain, crop characteristics, etc. that can be encountered by a combine harvester, it can be very difficult to determine how a particular machine, or operator, is performing. This problem is exacerbated when a particular organization has a plurality of different combine harvesters that are all operating at the same time. These combine harvesters are often referred to as a "fleet" of harvesters.

The operation of the fleet of harvesters is often overseen by a (remote or local) fleet manager (or farm manager) who is located remotely relative to at least some of the combine harvesters in the fleet. It can be extremely difficult for a farm manager or remote manager to determine how the various combine harvesters are operating in the fleet, how they are operating relative to one another, how they are operating relative to other similarly situated harvesters, etc.

It is also extremely difficult for a remote manager to identify performance criteria for the various operators and machines, and determine how they compare relative to one another, in near real time. Thus, it is very difficult for a remote manager to attempt to modify the settings on any combine harvester to increase the performance of that harvester. This is because the remote manager does not have access to the current settings of a particular machine, nor does the remote manager have access to an interface that allows the remote manager to view and interact with display elements that to adjust the machine settings of the combine. Also, some systems currently allow remote viewing of settings, to some extent. One drawback is the delay time involved. In current systems, there may be a delay of thirty minutes or more, and even then, there is no ability to control the settings. Instead, in some current systems, the remote manager might make a phone call to the operator of the harvester. One problem with this is the time it takes to communicate the situation and desired action to the operator, the potential for human error in transmitting and understanding instructions, and the distraction that is caused for the operator while he talks on the phone (which can result in lower performance and higher chance of mistakes). Also, the sheer volume of calls can be immense. A manager might have several hundred a day.

FIG. 1 is a partial pictorial, partial schematic, illustration of an agricultural machine 100, in an example where machine 100 is a combine harvester (or combine). It can be seen in FIG. 1 that combine 100 illustratively includes an operator compartment 101, which can have a variety of different operator interface mechanisms, for controlling combine 100, as will be discussed in more detail below. Combine 100 can include a set of front end equipment that can include header 102, and a cutter generally indicated at 104. It can also include a feeder house 106, a feed accelerator 108, and a thresher generally indicated at 110. Thresher 110 illustratively includes a threshing rotor 112 and a set of concaves 114. Further, combine 100 can include a separator 116 that includes a separator rotor. Combine 100 can include a cleaning subsystem (or cleaning shoe) 118 that, itself, can include a cleaning fan 120, chaffer 122 and sieve 124. The material handling subsystem in combine 100 can include (in addition to a feeder house 106 and feed accelerator 108) discharge beater 126, tailings elevator 128, clean grain elevator 130 (that moves clean grain into clean grain tank 132) as well as unloading auger 134 and spout 136. Combine 100 can further include a residue subsystem 138 that can include chopper 140 and spreader 142. Combine 100 can also have a propulsion subsystem that includes an engine that drives ground engaging wheels 144 or tracks, etc. It will be noted that combine 100 may also have more than one of any of the subsystems mentioned above (such as left and right cleaning shoes, separators, etc.).

In operation, and by way of overview, combine 100 illustratively moves through a field in the direction indicated by arrow 146. As it moves, header 102 engages the crop to be harvested and gathers it toward cutter 104. After it is cut, it is moved through a conveyor in feeder house 106 toward feed accelerator 108, which accelerates the crop into thresher 110. The crop is threshed by rotor 112 rotating the crop against concave 114. The threshed crop is moved by a separator rotor in separator 116 where some of the residue is moved by discharge beater 126 toward the residue subsystem 138. It can be chopped by residue chopper 140 and spread on the field by spreader 142. In other implementations, the residue is simply dropped in a windrow, instead of being chopped and spread.

Grain falls to cleaning shoe (or cleaning subsystem) 118. Chaffer 122 separates some of the larger material from the grain, and sieve 124 separates some of the finer material from the clean grain. Clean grain falls to an auger in clean grain elevator 130, which moves the clean grain upward and deposits it in clean grain tank 132. Residue can be removed from the cleaning shoe 118 by airflow generated by cleaning fan 120. That residue can also be moved rearwardly in combine 100 toward the residue handling subsystem 138.

Tailings can be moved by tailings elevator 128 back to thresher 110 where they can be re-threshed. Alternatively, the tailings can also be passed to a separate re-threshing mechanism (also using a tailings elevator or another transport mechanism) where they can be re-threshed as well.

FIG. 1 also shows that, in one example, combine 100 can include ground speed sensor 147, one or more separator loss sensors 148, a clean grain camera 150, and one or more cleaning shoe loss sensors 152. Ground speed sensor 146 illustratively senses the travel speed of combine 100 over the ground. This can be done by sensing the speed of rotation of the wheels, the drive shaft, the axle, or other components. The travel speed can also be sensed by a positioning system, such as a global positioning system (GPS), a dead reckoning system, a LORAN system, or a wide variety of other systems or sensors that provide an indication of travel speed.

Cleaning shoe loss sensors 152 illustratively provide an output signal indicative of the quantity of grain loss by both the right and left sides of the cleaning shoe 118. In one example, sensors 152 are strike sensors which count grain strikes per unit of time (or per unit of distance traveled) to provide an indication of the cleaning shoe grain loss. The strike sensors for the right and left sides of the cleaning shoe can provide individual signals, or a combined or aggregated signal. It will be noted that sensors 152 can comprise only a single sensor as well, instead of separate sensors for each shoe.

Separator loss sensor 148 provides a signal indicative of grain loss in the left and right separators. The sensors associated with the left and right separators can provide separate grain loss signals or a combined or aggregate signal. This can be done using a wide variety of different types of sensors as well. It will be noted that separator loss sensors 148 may also comprise only a single sensor, instead of separate left and right sensors.

It will also be appreciated that sensor and measurement mechanisms (in addition to the sensors already described) can include other sensors on combine 100 as well. For instance, they can include a residue setting sensor that is configured to sense whether machine 100 is configured to chop the residue, drop a windrow, etc. They can include cleaning shoe fan speed sensors that can be configured proximate fan 120 to sense the speed of the fan. They can include a threshing clearance sensor that senses clearance between the rotor 112 and concaves 114. They include a threshing rotor speed sensor that senses a rotor speed of rotor 112. They can include a chaffer clearance sensor that senses the size of openings in chaffer 122. They can include a sieve clearance sensor that senses the size of openings in sieve 124. They can include a material other than grain (MOG) moisture sensor that can be configured to sense the moisture level of the material other than grain that is passing through combine 100. They can include machine setting sensors that are configured to sense the various configurable settings on combine 100. They can also include a machine orientation sensor that can be any of a wide variety of different types of sensors that sense the orientation of combine 100. Crop property sensors can sense a variety of different types of crop properties, such as crop type, crop moisture, and other crop properties. They can also be configured to sense characteristics of the crop as they are being processed by combine 100. For instance, they can sense grain feed rate, as it travels through clean grain elevator 130. They can sense mass flow rate of grain through elevator 130, or provide other output signals indicative of other sensed variables. Some additional examples of the types of sensors that can be used are described below.

Figure 2:
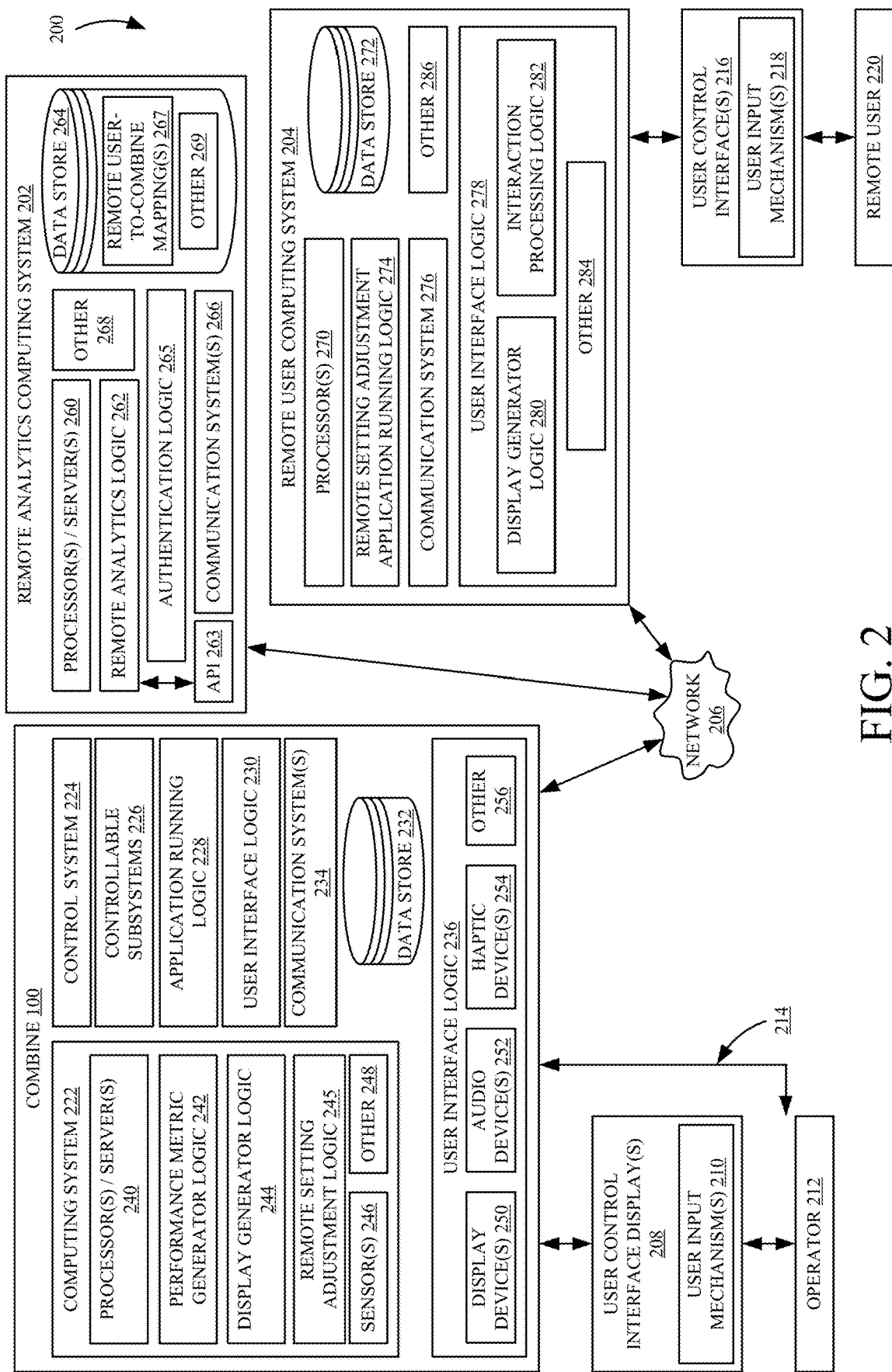
FIG. 2 is a block diagram of one example of a computing system architecture that includes the combine harvester illustrated in FIG. 1.

FIG. 2 is a block diagram showing one example of an architecture 200 that includes combine harvester 100 coupled for communication with remote analytics computing system 202 and remote manager computing 204, over network 206. Network 206 can be any of a wide variety of different types of networks, such as a wide area network, a local area network, a near field communication network, a cellular network, or any of a wide variety of other networks or combinations of networks. As is discussed in greater detail below, combine harvester 100 can communicate with other systems using store-and-forward mechanisms as well. FIG. 2 also shows that, in one example, combine harvester 100 can generate operator interface displays 208 with user input mechanisms 210 for interaction by operator 212. Operator 212 is illustratively a local operator of combine 100, in the operator's compartment of combine 100, and can interact with user input mechanisms 210 in order to control and manipulate combine harvester 100. In addition, as is described below, operator 212 can interact directly with other user interface mechanisms on combine harvester 100. This is indicated by arrow 214.

FIG. 2 also shows that, in one example, remote manager computing system 204 illustratively generates user interfaces 216, with user input mechanisms 218, for interaction by remote user 220 (who may be a farm manager, a remote manager, or other remote user that has access to data corresponding to combine 100). Remote user 220 illustratively interacts with user input mechanisms 218 in order to control and manipulate remote manager computing system 204, and, in some examples, to control portions of combine harvester 100 and/or remote analytics computing system 202.

Before describing the overall operation of architecture 200 in more detail, a brief description of some of the items in architecture 200, and their operation, will first be provided. As shown in FIG. 2, in addition to the items described above with respect to FIG. 1, combine 100 can include computing system 222, one or more control systems 224, controllable subsystems 226, application running logic 228, user interface logic 230, data store 232, one or more communication systems 234, user interface mechanisms 236, and it can include a wide variety of other items 238. Computing system 222, itself, can include one or more processors or servers 240, performance metric generator logic 242, display generator logic 244, remote setting adjustment logic 245, a plurality of different sensors 246, and it can include a wide variety of other items 248. User interface mechanisms 236 can include one or more display devices 250, one or more audio devices 252, one or more haptic devices 254, and it can include other items 256, such as a steering wheel, joysticks, pedals, levers, buttons, keypads, etc.

As described above with respect to FIG. 1, sensors 246 can generate a wide variety of different sensor signals representing a wide variety of different sensed variables. Performance metric generator logic 242 (as is described in greater detail below with respect to FIG. 3) illustratively generates performance metrics indicative of the operational performance of combine 100. Display generator logic 244 illustratively generates a control interface display for operator 212. The display can be an interactive display with user input mechanisms 210 for interaction by operator 212.

Control system 224 can generate control signals for controlling a variety of different controllable subsystems 226 based on the sensor signals generated by sensors 246, based on the performance metrics generated by performance score generator logic 244, based upon user inputs received through user interface mechanisms 236, based upon information received from remote manager computing system 204 or from remote analytics computing system 202, or it can generate control signals a wide variety of other ways as well. Controllable subsystems 226 can include a variety of different systems, such as a propulsion system used to drive combine 100, a threshing subsystem as described above with respect to FIG. 1, a cleaning subsystem (such as the cleaning fan, the chaffer, the sieve, etc.) and/or a variety of other controllable subsystems, some of which are discussed above with respect to FIG. 1.

Application running logic 228 can illustratively run any of a variety of different applications that may be stored in data store 232. The applications can be used to control combine 100, such as by interacting with control system 224 to control controllable subsystems 226, to aggregate information sensed and collected by combine 100, to communicate that information to other systems, etc. Communication systems 234 illustratively include one or more communication systems that allow combine 100 to communicate with remote analytics computing system 202 and remote manager computing system 204. Thus, they include one or more communication systems, that can communicate over the networks described above.

Display generator logic 244 illustratively generates an operator display and uses user interface logic 230 to display the operator display on one of display devices 250. It will be noted that display devices 250 can include a display device that is integrated into the operator compartment of combine 100, or it can be a separate display on a separate device that may be carried by operator 212 (such as a laptop computer, a mobile device, etc.). All of these architectures are contemplated herein.

In the example shown in FIG. 2, remote analytics computing system 202 illustratively includes one or more processors or servers 260, remote analytics logic 262 which exposes an application programming interface (API) 263, data store 264, authentication system 265, one or more communication systems 266 and it can include a wide variety of other items 268. Remote analytics logic 262 illustratively receives the performance metrics generated by performance metric generator logic 242 in computing system 222, from a plurality of different combines, including combine 100. It can illustratively aggregate that data and compare it to reference sets of data to generate multi-machine performance metrics that are based on the performance information from a plurality of different machines. The data can be stored on data store 202, along with a wide variety of other information, such as operator information corresponding to the operators of each of the combines, machine details identifying the particular machines being used, the current machine settings for each machine that are updated by the machines, and historical data collected from the various machines. The data store 202 can include authentication information used to authenticate remote user 220, operator 212, and others. It can include mappings 267 that map between combines and the remote users they are assigned to. It can include a wide variety of other information 269 as well.

Remote analytics computing system 202 illustratively uses one or more of the communication systems 266 to communicate with both combine 100 (and other combines) and remote manager computing system 204.

Remote manager computing system 204 can be a wide variety of different types of systems, such as a mobile device, a laptop computer, etc. It illustratively includes one or more processors 270, data store 272, application running logic 274, communication system 276, and user interface logic 278 (which, itself, includes display generator logic 280, interaction processing logic 282, and it can include other items 284). Remote manager computing system 204 can, also include a wide variety of other items 286.

Application running logic 274 illustratively runs an application that allows remote user 220 to access comparison information that compares the performance of various combines 100 and their operators on a near real time basis (such as within five seconds of real time or within another time value of real time). It also illustratively surfaces user control interfaces 216, with user input mechanisms 218 so that remote user 220 can provide settings inputs, or other control information, and communicate it to one or more combines 100. Again, as with communication systems 234 and 266, communication system 276 allows remote manager computing system 204 to communicate with other systems over network 206. Display generator logic 282 illustratively generates a display, with various interactive display elements on control user interface 216. Interaction processing logic 282 illustratively detects user interaction with the display, from remote user 220, and performs control operations based upon those user interactions.

Figure 3:
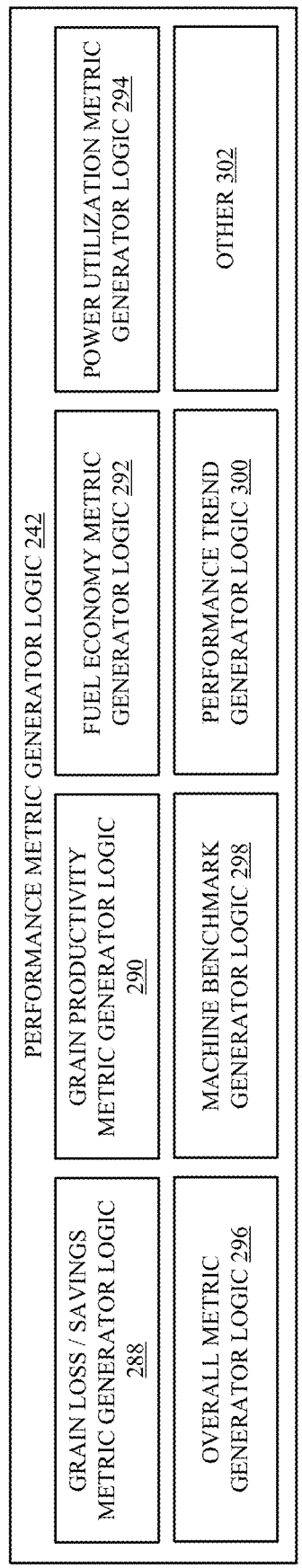
FIG. 3 is a block diagram showing one example of performance score generator logic in more detail.

FIG. 3 is a block diagram showing one example of performance metric generator logic 242, in more detail. In the example shown in FIG. 3, performance metric generator logic 242 illustratively includes grain loss/savings metric generator logic 288, grain productivity metric generator logic 290, fuel economy metric generator logic 292, power utilization metric generator logic 294, overall metric generator logic 296, machine benchmark generator logic 298, performance trend generator logic 300, and it can include a wide variety of other items 302. Some ways of generating performance metrics are shown in more detail in co-pending US Patent Publication numbers 2015/0199637 A1, 2015/0199360 A1, 2015/0199630 A1, 2015/0199775 A1, 2016/0078391 A1 which are incorporated herein by reference.

Grain loss/savings metric generator logic 288 illustratively generates a metric indicative of grain savings or grain loss that the combine 100 is experiencing. This can be generated by sensing and combining items such as the mass flow of crop through combine 100 sensed by a sensor 246, tailings volume of tailings output by combine 100 using a volume sensor, crop type, the measured loss on combine 100 using various loss sensors (such as separator loss sensors, cleaning shoe loss sensors, etc.), among others. The metric can be generated by performing an evaluation of the loss using fuzzy logic components and an evaluation of the tailings, also using fuzzy logic components. Based upon these and/or other considerations, grain loss/savings metric generator logic 288 illustratively generates a grain loss/savings metric indicative of the performance of combine 100, under the operation of operator 212, with respect to grain loss/savings.

Grain productivity metric generator logic 290 illustratively uses the sensor signals generated by sensors 246 on the combine to sense vehicle speed, mass flow of grain through combine 100, and the machine configuration of combine 100 and generates an indication of crop yield and processes the crop yield to evaluate it against a productivity metric. For instance, a productivity metric plotted against a yield slope provides an output indicative of grain productivity. This is only one example.

Fuel economy metric generator logic 292 illustratively generates a fuel economy metric, based upon the throughput versus fuel consumption rate sensed by sensors on the combine 100, a separator efficiency metric and also, based upon sensed fuel consumption that is sensed by a sensor 246, vehicle state, vehicle speed, etc. The fuel economy metric can be based on a combination of a harvest fuel efficiency and a non-productive fuel efficiency. These metrics may indicate, respectively, the efficiency of combine 100 during harvesting operations, and in other, non-harvesting operations (such as when idling, etc.). Again, fuzzy logic components are illustratively applied to generate a metric indicative of fuel economy, although this is only one example.

Power utilization generator logic 294 illustratively generates a power utilization metric based on sensor signals from sensors 246 (or based on derived engine power used by combine 100, that is derived from sensor signals) under the control of operator 212. The sensors may generate sensor signals indicative of engine usage, engine load, engine speed, etc. The power utilization metric may indicate whether the machine could be more efficiently run at higher or lower power levels, etc.

Overall metric generator logic 296 illustratively generates a metric that is based upon a combination of the various metrics output by logic 288-294. It illustratively provides a metric indicative of the overall operational performance of combine 100, under the operation of operator 212.

Machine benchmark generator logic 298 illustratively generates a machine benchmark metric for each of the metrics generated by items of logic 288-296. The machine benchmark metric can, for instance, reflect the operation of combine 100, under the control of operator 212, for each of the particular metrics, over a previous time period. For instance, the machine benchmark metric for grain loss/savings may be an average of the value of the grain loss/savings metric generated by logic 288 over the prior 10 hours (or over another time period). In one example, machine benchmark generator logic 298 generates such a benchmark metric for each of the categories or metrics generated by items of logic 288-296.

Performance trend generator logic 300 illustratively generates a metric indicative of the performance of machine 100, under the operation of operator 212, over a shorter period of time than is considered by machine benchmark generator logic 298. For instance, performance trend generator logic 300 illustratively generates a trend metric indicating how combine 100 has performed over the previous 30 minutes, in each of the performance categories addressed by items of logic 288-296. In one example, it saves periodically-generated values so that it can generate a trace or continuous depiction of the value of that particular metric over the previous 30 minutes (or other time period). This is described in more detail below with respect to FIGS. 7A and 12.

Figure 4:
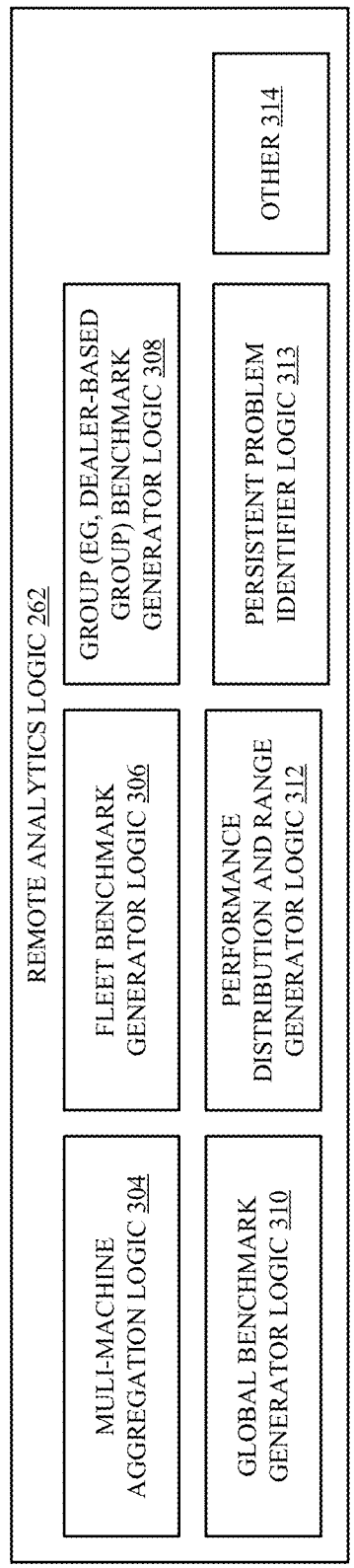
FIG. 4 is a block diagram showing one example of remote analytics logic in more detail.

FIG. 4 is a block diagram showing one example of remote analytics logic 262 in more detail. FIG. 4 shows that, in one example, remote analytics logic 262 includes multi-machine aggregation logic 304, fleet benchmark generator logic 306, group (e.g., location-based group or other group) benchmark generator logic 308, global benchmark generator logic 310, performance distribution and range generator logic 312, persistent problem identifier logic 313, and it can include a wide variety of other items 314. Multi-machine aggregation logic 304 illustratively aggregates performance information received from a plurality of different combines (including combine 100) and aggregates that information so that it can be stored or retrieved for comparison or other processing. Fleet benchmark generator logic 306 illustratively generates a fleet benchmark metric based upon the multi-machine information aggregated by logic 304. The fleet benchmark metric is illustratively indicative of the performance of a fleet of combines 100 corresponding to a particular organization that are currently harvesting the same crop as combine 100, over the last 10 hours (or other time period). Thus, in one example, fleet benchmark generator logic 306 illustratively generates an average metric indicating the average performance metric, in each of the performance categories discussed above with respect to FIG. 3, for all combines currently operating in the fleet. The average may be calculated based upon the particular performance metric values aggregated for all such combines over the last 10 hours.

Group (e.g., location-based group or other group) benchmark generator logic 308 illustratively generates a similar benchmark metric, except that the number of combines that the metric is generated over is larger than that used by fleet benchmark generator logic 306. Instead, combines from which data is obtained to generate the group benchmark metric may include data from multiple fleets or other groups.

Global benchmark generator logic 310 generates a similar set of metrics (one for each of the performance categories discussed above with respect to FIG. 3), except that the number of combines from which data is obtained to generate the metric is larger than that used by group benchmark generator logic 308. For instance, in one example, global benchmark generator logic 310 may generate a performance metric based upon the performance data obtained from all combines (which are accessible by remote analytics computing system 202) that are harvesting globally in a particular crop. The metric may be generated based on the data aggregated from those combines over the past 10 hours (or other time period).

Performance distribution and range generator logic 312 illustratively identifies a statistical distribution of observed performance values for combines 100. The statistical distribution may be generated in terms of a bell curve so that the performance values are divided into ranges corresponding to a high performance operating range, an average performance operating range and a low performance operating range. These are examples only.

Persistent problem identifier logic 313 illustratively monitors the various performance metrics and information received from a plurality of different combines 100 to determine whether any of the combines are exhibiting a persistent problem. For instance, persistent problem identifier logic 313 can compare the various performance metrics against threshold values to determine whether a particular machine is consistently operating below a desired threshold of operation. By way of example, assume that the measured grain loss/savings metric on a given combine 100 has been running consistently below a desired threshold value. In addition, assume that the measured value of the grain loss/savings metric has been below the threshold value for a threshold time value. The threshold time value may be a predetermined time (such as several minutes), or it may be dynamically determined. In addition, the threshold time value may vary based upon the particular performance metric being analyzed. In the example being discussed, if the performance metric value for the given combine is below the threshold for the threshold amount of time, then persistent problem identifier logic 313 identifies a persistent problem with respect to that combine.

Based on the identification of a persistent problem, logic 313 controls communication system 266 to obtain additional information from the given combine, if needed, and it can also retrieves additional information from data store 264. This information can be provided to remote user 220 in the form of a notification, an alert, etc. Even if remote user 220 is not running an application that would otherwise surface this alert or notification, the alert or notification can be processed on remote computing system 204 (as is discussed in greater detail below) to launch the desired application and to surface the notification/alert for interaction by remote user 220. In one example, it is surfaced with actuators that allow remote user 220 to control setting adjustments on the combine with the persistent problem.

Figure 5:
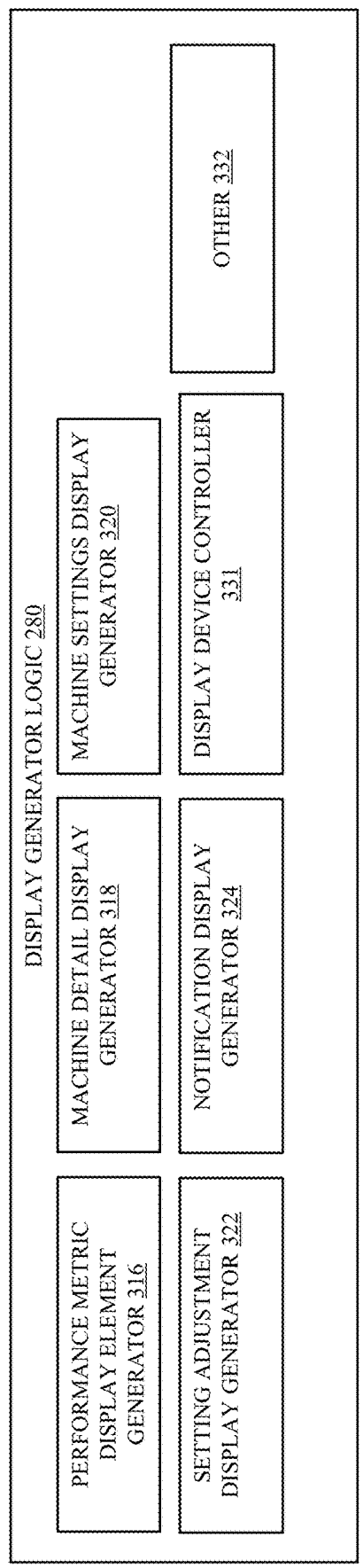
FIG. 5 is a block diagram showing one example of display generator logic in more detail.

FIG. 5 is a block diagram showing one example of display generator logic 280 in the user interface logic 278 of remote user computing system 204, in more detail. Display generator logic 280 illustratively includes performance metric display generator 316, machine detail display generator 318, machine settings display generator 320, setting adjustment display generator 322, notification display generator 324, display device controller 331 and it can include a wide variety of other items 332.

Performance metric display generator 316 illustratively generates display elements that display the performance metrics for a selected combine, or a group of combines (so that the performance metrics can be compared from one machine to the next). The metrics can be those described above with respect to performance metric generator logic 242 on combine 100 and those generated by the various logic items on remote analytics logic 262.

Machine detail display generator 318 illustratively obtains various machine details (some of which will be described in greater detail below) for a machine under analysis and generates display elements that are indicative of the machine details. For instance, the machine detail display generator 318 can control communication system 276 to obtain near real time sensor signal values from sensors 246 on combine 100, and generate display elements indicative of those sensor signal values. This is just one example.

Machine settings display generator 320 illustratively obtains the current machine settings for the combine 100 under analysis and generates display elements indicative of those machine settings. Some examples of this are shown and described below.

Setting adjust display generator 322 illustratively generates a setting adjustment display, with setting adjustment actuators that can be actuated by remote user 220 in order to adjust the settings on the combine being analyzed, or on a set of combines. There are a variety of different adjustment actuators that can be used and some examples are described below.

Notification display generator 324 illustratively generates notification displays based upon notifications or alerts received from other items in architecture 100 It also displays those generated by the application running on remote user computing system 204.

Display device controller 331 illustratively controls a display device on remote user computing system 204 in order to display the various elements and displays generated by the items 316-324. Again, some examples of these are described in greater detail below.

Figure 6:
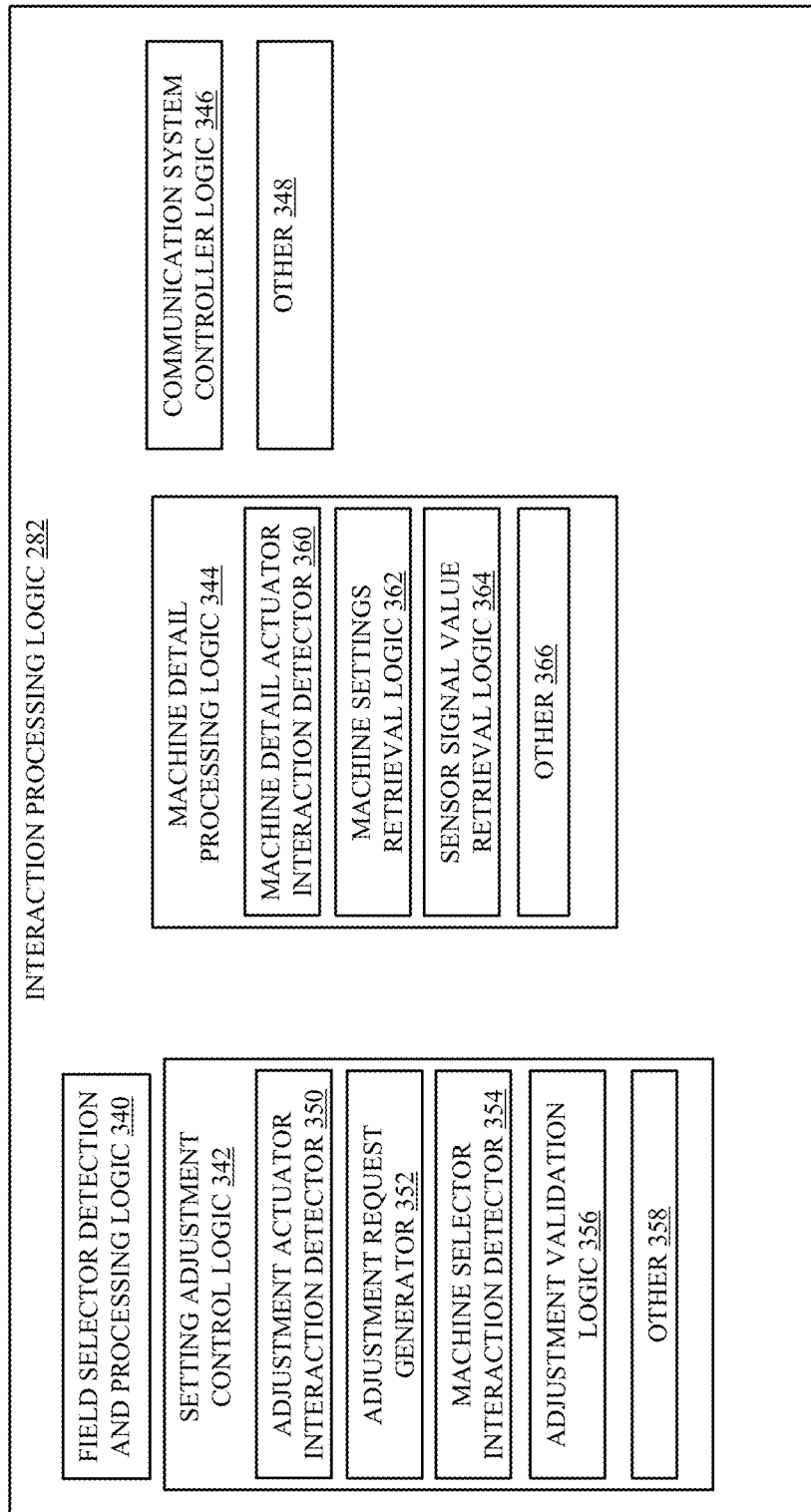
FIG. 6 is a block diagram showing one example of interaction processing logic in more detail.

FIG. 6 is a block diagram showing one example of interaction processing logic 282 (on remote user computing system 204) in more detail. In the example shown in FIG. 6, interaction processing logic 282 illustratively includes field selector detection and processing logic 340, setting adjustment control logic 342, machine detail processing logic 344, communication system controller logic 346, and it can include a wide variety of other items 348. Setting adjustment control logic 342, itself, illustratively includes adjustment actuator interaction detector 350, adjustment request generator 352, machine selector interaction detector 354, adjustment validation logic 356, and it can include other items 358. Machine detail processing logic 344, itself, illustratively includes machine detail actuator interaction detector 360, machine settings retrieval logic 362, sensor signal value retrieval logic 364, and it can include other items 366.

In operation, and by way of overview, field selector detection and processing logic 340 illustratively detects user actuation of a field selector on a user interface 216. It illustratively retrieves information corresponding to the selected field (such as which combines are operating in that field, the crop planted in the field, the location of the field, etc.). It then controls display generator logic 280 to display information about the combines operating in the selected field.

Machine detail actuator interaction detector 360 detects that remote user 220 has actuated a user interface element that requests machine details for one or more of the machines operating in the selected field. It then controls communication system 276 to request the machine detail information from the combine itself, or from remote analytics computing system 202, or both. Machine settings retrieval logic 362 also controls communication system 276 to retrieve the machine settings for the machine, based upon user actuation of a corresponding user interface element. Sensor signal value retrieval logic 364 can also control communication system 276 in order to open a secure communication link with combine 100 so that it can receive the near real time sensor signal values from various sensors on combine 100, as they are generated. The secure communication link can be through remote analytics computing system 202, or it can be a direct link or another type of link with combine 100. Communication system controller logic 346 generates the communication system control signals to control communication system 276. It can do this either by itself, or under the direction of other items in FIG. 6.

Adjustment actuator interaction detector 350 illustratively detects user interaction by remote user 220 of an adjustment actuator that allows a remote user 220 to adjust the machine settings displayed to remote user 220. Adjustment request generator 352 illustratively generates an adjustment request that can be sent to one or more machines to adjust the machine settings based upon the adjustment inputs provided through adjustment actuator interaction detector 350.

Machine selector interaction detector 354 illustratively detects user interaction with a machine selector that can be actuated to select a set of machines to which the adjustment requests will be sent. For instance, it may be that remote user 220 has been assigned responsibility for a plurality of different combines 100. In that case, remote user 220 can select any of those combines that remote user 220 is authorized to access (such as those identified in mappings 267 in remote analytics computing system 202) and apply a settings adjustment to all of those machines, or a subset of those machines, by actuating the machine selector, which is detected by interaction detector 354.

Adjustment validation logic 356 validates that the requested adjustments have been made. For instance, after a predetermined timeout period, adjustment validation logic 356 may control machine settings retrieval logic 362 to retrieve the machine settings from those machines for which a settings adjustment has been requested. The machine settings can then be displayed to remote user 220 so that remote user 220 can verify that the adjustments have been made. In another example, adjustment validation logic 356 automatically compares the retrieved machine settings to those reflected in the adjustment request that was sent to the machine to determine whether the adjustments have been made. If so, a notice to that effect can be displayed to the remote user 220. If not, an alert can be generated for remote user 220 as well.

Figure 7:
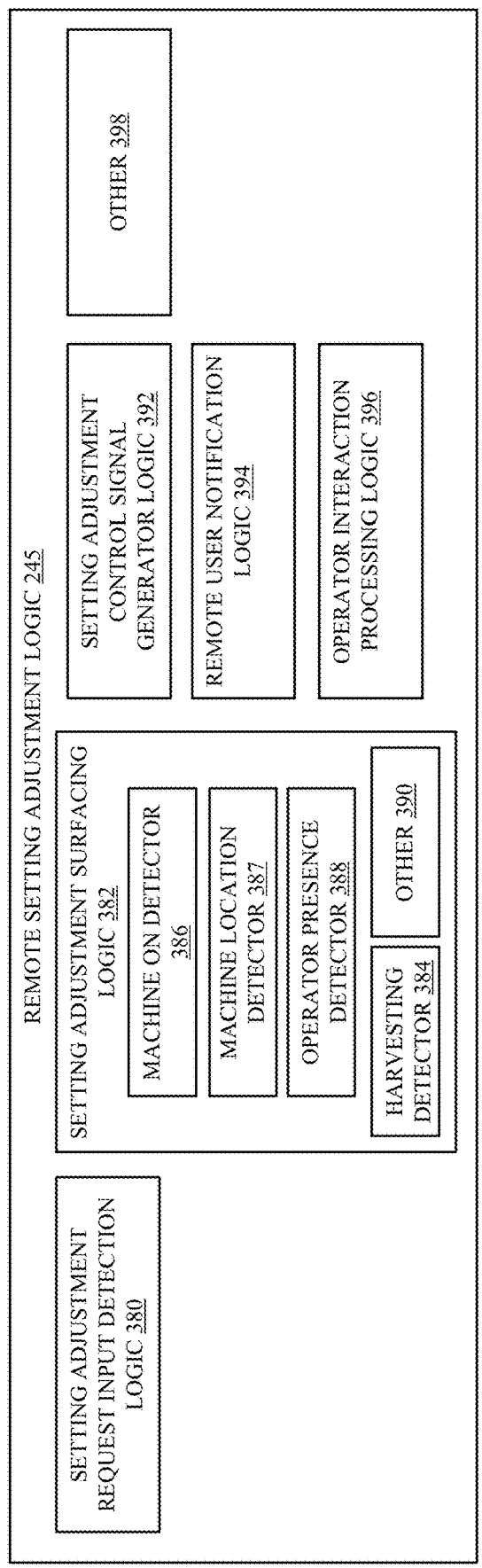
FIG. 7 is a block diagram showing one example of remote setting adjustment logic in more detail.

FIG. 7 is a block diagram showing one example of remote setting adjustment logic 245, on combine 100, in more detail. In the example shown in FIG. 7, remote setting adjustment logic illustratively includes setting adjustment request input detection logic 380, setting adjustment surfacing logic 382 (which itself illustratively includes harvesting condition detector 384, machine on condition detector 386, machine location detector 387, operator presence detector 388, and it can include other items 390), setting adjustment control signal generator logic 392, remote user notification logic 394, operator interaction processing logic 396, and it can include a wide variety of other items 398.

Setting adjustment request input detection logic 280 illustratively detects when a setting adjustment request has been received through communication system 224, from a remote user computing system 204. Setting adjustment surfacing logic 382 then surfaces the setting adjustment request, when certain conditions are met. For instance, machine on detector 386 detects whether combine 100 is running, and machine location detector 387 detects whether combine 100 is in a field. Operator presence detector 388 detects whether an operator is present in the operating compartment. Harvesting detector 384 detects whether the combine 100 is performing a harvesting operation (such as whether the header is engaged). Based upon the signals generated by detectors 384-388, it may be that logic 382 determines that conditions are present for surfacing the settings adjustment request to operator 212.

In one example, it may be that the setting adjustment is to be performed automatically. In another example, the setting adjustment is made only after operator 212 accepts the setting adjustment. In the latter example, operator interaction processing logic 396 determines whether the operator 212 has actuated an acceptance actuator to accept the adjustment setting request. If so, or if the setting adjustments are to be made automatically, setting adjustment control signal generator logic 392 generates control signals that are used by control system 224 to control the controllable subsystems 226 in order to make the setting adjustments to the controllable subsystems.

Remote user notification logic 394 then controls communication system 234 in order to send a notification to remote user computing system 204 that the user has either accepted or declined the setting adjustment request. It can also send a notification that includes the new machine settings, after the adjustment has been made, to confirm that the settings have now been adjusted to conform with the setting adjustment request.

Figure 8A:
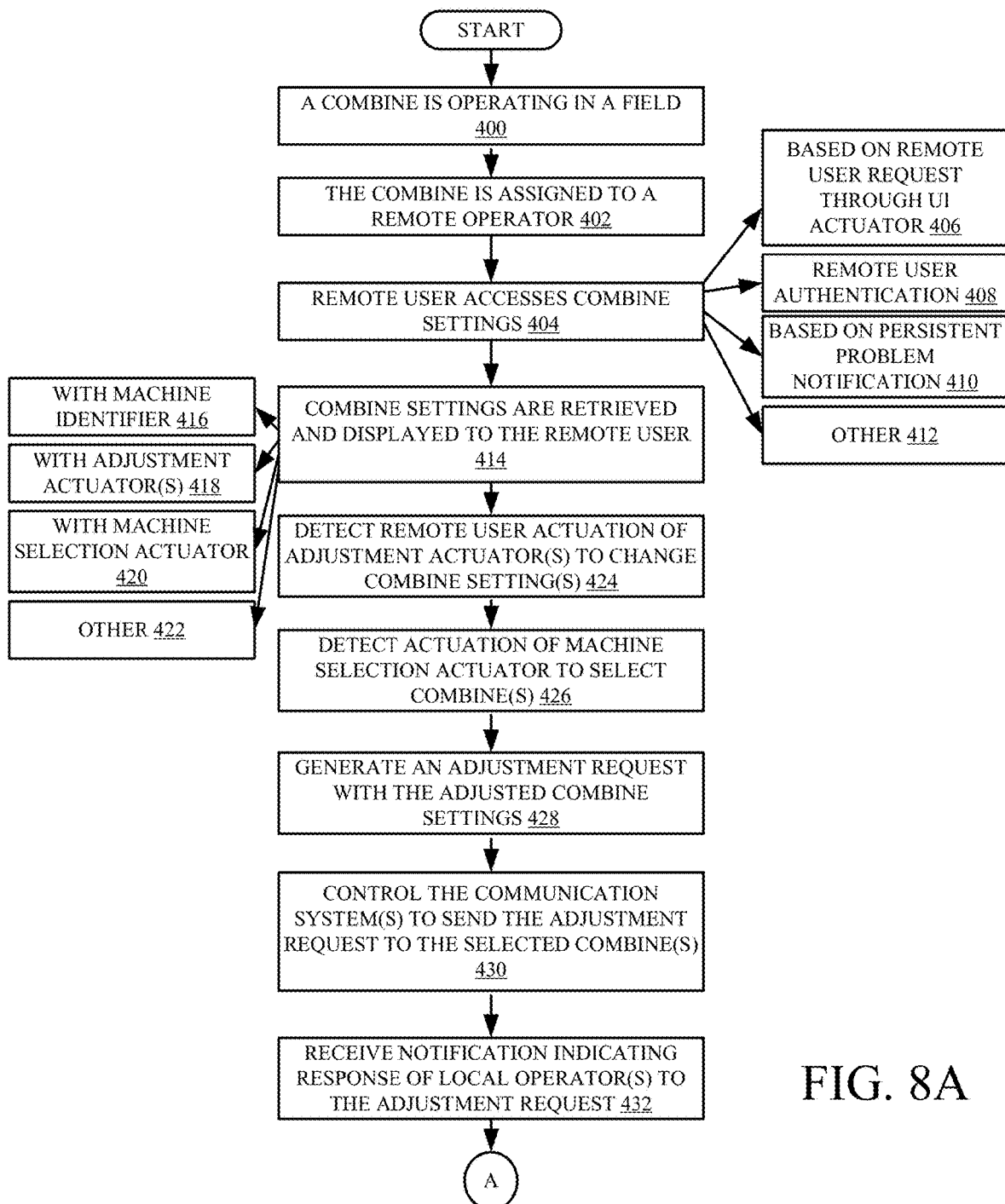
FIGS. 8A and 8B illustrate a flow diagram showing one example of the operation of the remote computing system in performing a setting adjustment.
Figure 8B:
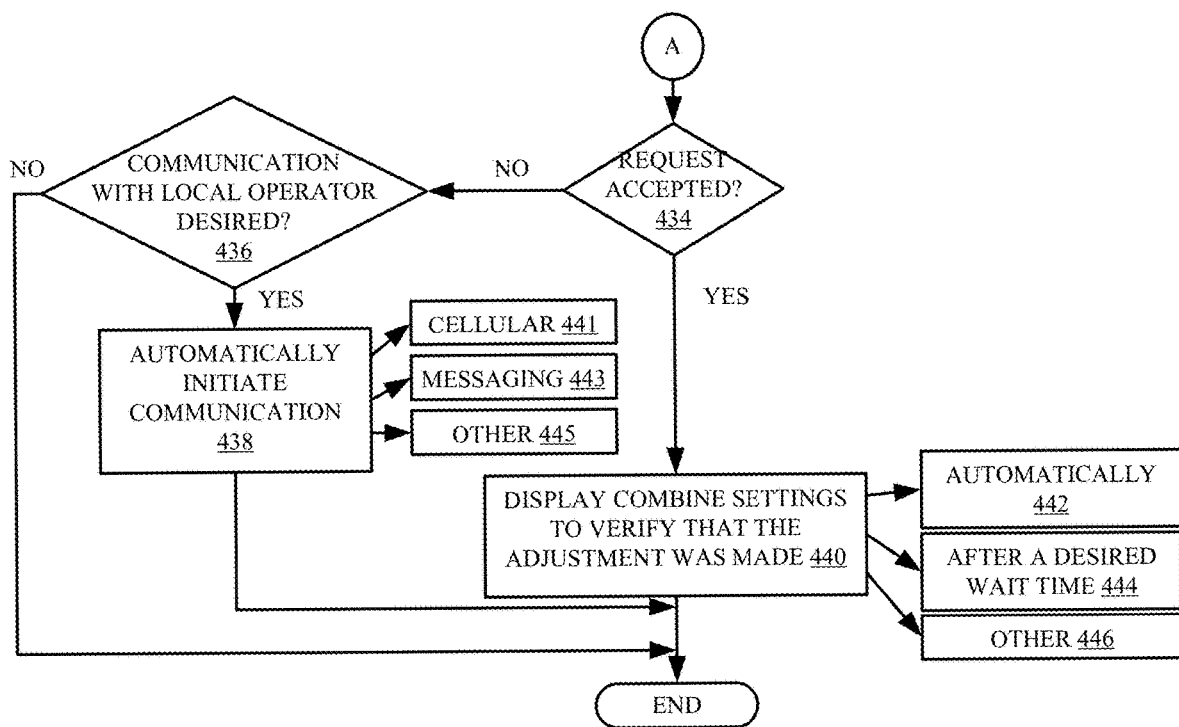

FIGS. 8A and 8B (collectively referred to herein as FIG. 8) illustrate a flow diagram showing the operation of remote user computing system 204 in allowing remote user 220 to make a settings adjustment request and transmit it to one or more combines 100. It is first assumed that a combine is operating in a field and that the operating combine is assigned to remote user 220 (e.g., it is mapped to remote user 220 by mappings 267). This is indicated by blocks 400 and 402 in the flow diagram of FIG. 8.

Remote setting adjustment application running logic 274 is illustratively running a remote setting adjustment application which detects that remote user 220 has accessed (or provided an input indicating that he or she wishes to review) the machine settings for one or more combines. This is indicated by block 404. This can be done in a variety of different ways. For instance, it may be that remote user 220 has actuated a user interface actuator generated by the remote settings adjustment application that allows user 220 to view the machine settings for a combine. This is indicated by block 406. In that case, remote user authentication will first be performed to ensure that remote user 220 is authorized to view the settings. This is indicated by block 408. In another example, it may be that persistent problem identifier logic 313 in remote analytics logic 262 has identified a persistent problem with one of the combines that are mapped to remote user 220. In that case, an alert or notification may be sent to remote user 220, and the remote user 220 may be interacting with the notice or alert. The interaction may indicate that remote user 220 wishes to review the machine settings. This is indicated by block 410. An indication that remote user 220 wishes to review the machine settings can be identified in a wide variety of other ways as well, and this indicated by block 412.

Machine settings retrieval logic 362 then retrieves the machine settings and controls display generator logic 280 to display those settings to remote user 220. This is indicated by block 414. The machine settings can be displayed with a machine identifier 416 identifying the particular combine they are from. They can be displayed with one or more adjustment actuators 418 that allow remote user 220 to make adjustments to the machine settings. They can be displayed with machine selection actuator 420 that allows remote user 220 to select various machines to which the setting adjustment is to be applied. They can be displayed in other ways as well, and this is indicated by block 422.

At some point, adjustment actuator interaction detector 350 detects that remote user 220 has interacted with the adjustment actuator(s) to provide a settings adjustment that remote user 220 wishes the combine to make. Detecting remote user actuation of an adjustment actuator to change the combine settings is indicated by block 424.

Remote user 220 may so actuate the machine selector to select one or more machines (that the user is authorized to access) to apply the machine settings adjustment to all of the selected machines. This type of user interaction with the machine selector is detected by machine selector interaction detector 354, and detecting that actuation is indicated by block 426 in the flow diagram of FIG. 8.

Adjustment request generator 352 then generates a settings adjustment request that will be sent to the selected machines. In one example, adjustment request generator 352 allows remote user 220 to configure an adjustment request template which identifies machine settings values (or adjustments) that are to be made on the machines that the request is sent to. Generating an adjustment request with the adjusted combine settings is indicated by block 428.

Adjustment request generator 352 then uses communication system controller logic 346 to control communication system 276 in order to send the adjustment request to the selected combines. This is indicated by block 430. The selected combines then process the adjustment settings request, as is described in greater detail below with respect to FIGS. 10A-10B, and adjustment validation logic 356 then receives a notification indicating the operator's response to the adjustment request. This is indicated by block 432. It will be noted that, when multiple combines receive the setting adjustment request, a notification will be received indicating the operator response, from each of those combines.

In one example, the operator can either accept the setting adjustment request or decline it. A determination as to whether the setting adjustment request was accepted is indicated by block 434. If it was declined, then it may be that the remote settings adjustment application is configured to initiate communication between remote user 220 and operator 212 to determine why the request was declined. If that is the case, the application controls communication system 276 to automatically initiate communication with operator 212. This can be done using cellular communication, messaging, or any of a wide variety of other communication systems. Determining whether communication with the local operator is desired and, if so, automatically initiating that communication, are indicated by block 436 and 438 in the flow diagram of FIG. 8, respectively. Initiating cellular communication is indicated by block 441, initiating messaging communication is indicated by block 443, and initiating other types of communication is indicated by block 445.

If, at block 434, it is determined that the operator accepted the settings adjustment request, then adjustment validation logic 356 automatically uses machine settings retrieval logic 362 to again retrieve the machine settings from the combine for which the adjustment has been requested, and controls display generator logic 280 to display the new combine settings to verify that the adjustment was made. This is indicated by block 440 in the flow diagram of FIG. 8. This can be done automatically as indicated by block 442, it can be done after a desired time period (which may allow the operator to initiate the machine settings adjustment) as indicated by block 444, and it can be done in a variety of other ways as well, as indicated by block 446.

Figure 9A:
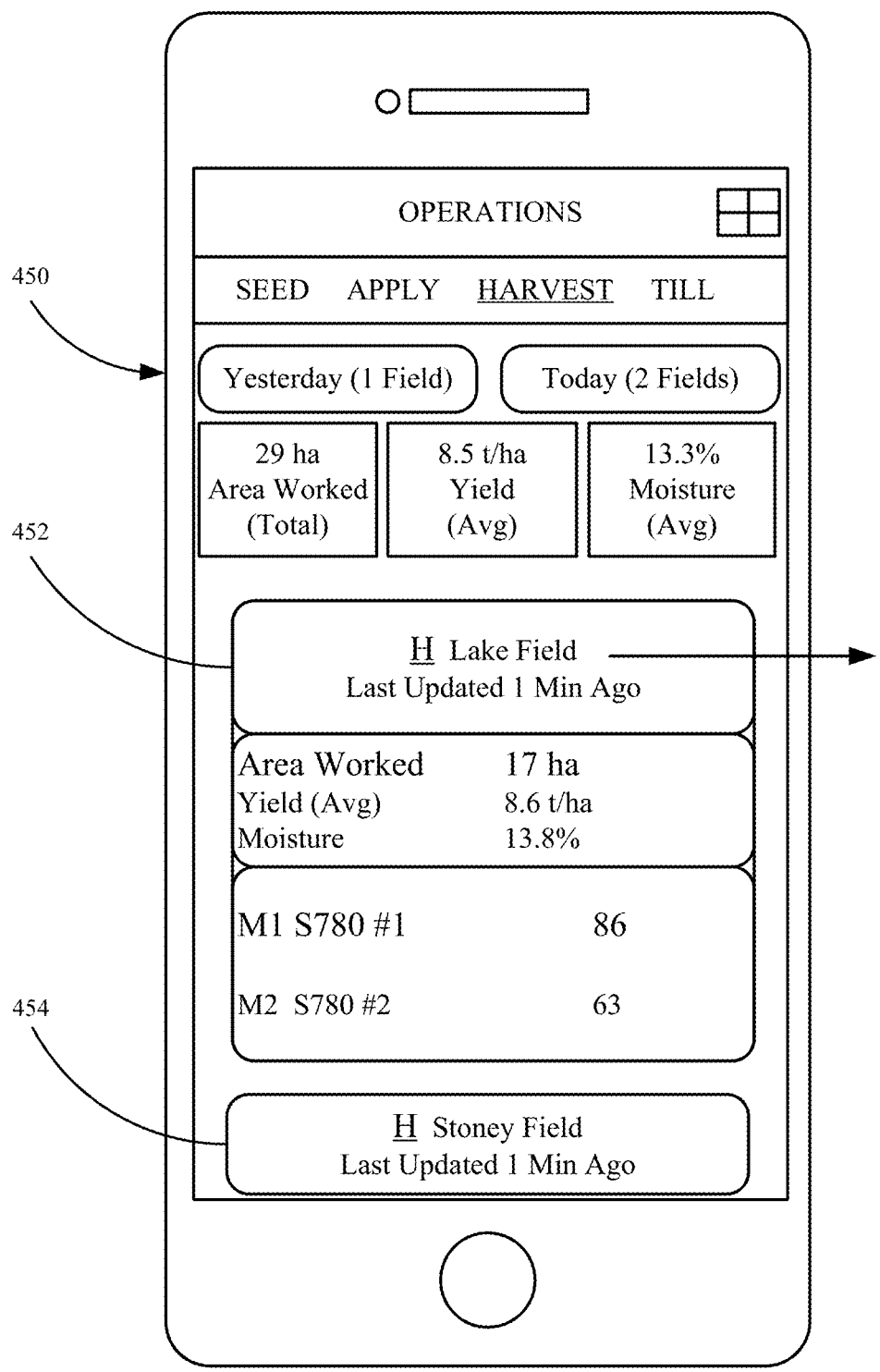
FIGS. 9A-9E show examples of user interface displays that can be generated on the remote computing system.

FIGS. 9A-9E show a series of user interface displays that can be generated by remote user computing system 204, and that allow remote user 220 to generate a setting change request that can be sent to one or more combines 100. FIG. 9A shows a user interface display 450 that displays field display elements 452 and 454, each of which corresponds to a different field that has combines operating in it, and for which remote user 220 has been assigned responsibility. The user illustratively actuates actuator 452, and a performance display 456 (such as that shown in FIG. 9B) is generated. Performance display 456 illustratively displays a set of performance metrics generally illustrated at 458, which show performance metrics for each of the different combines operating the selected field. It can display trend data 460 that shows the value of a selected performance metric (selected using metric selector 464) for a selected machine (selected using machine selector 462). Display 456 also includes a machine detail actuator 466 that can be actuated to view additional machine details for the selected machine. Further, it includes a machine settings display 468 that displays the machine settings for the selected machine, and it includes an adjustment actuator 470 that can be used to make machine setting adjustments.

Figure 9B:
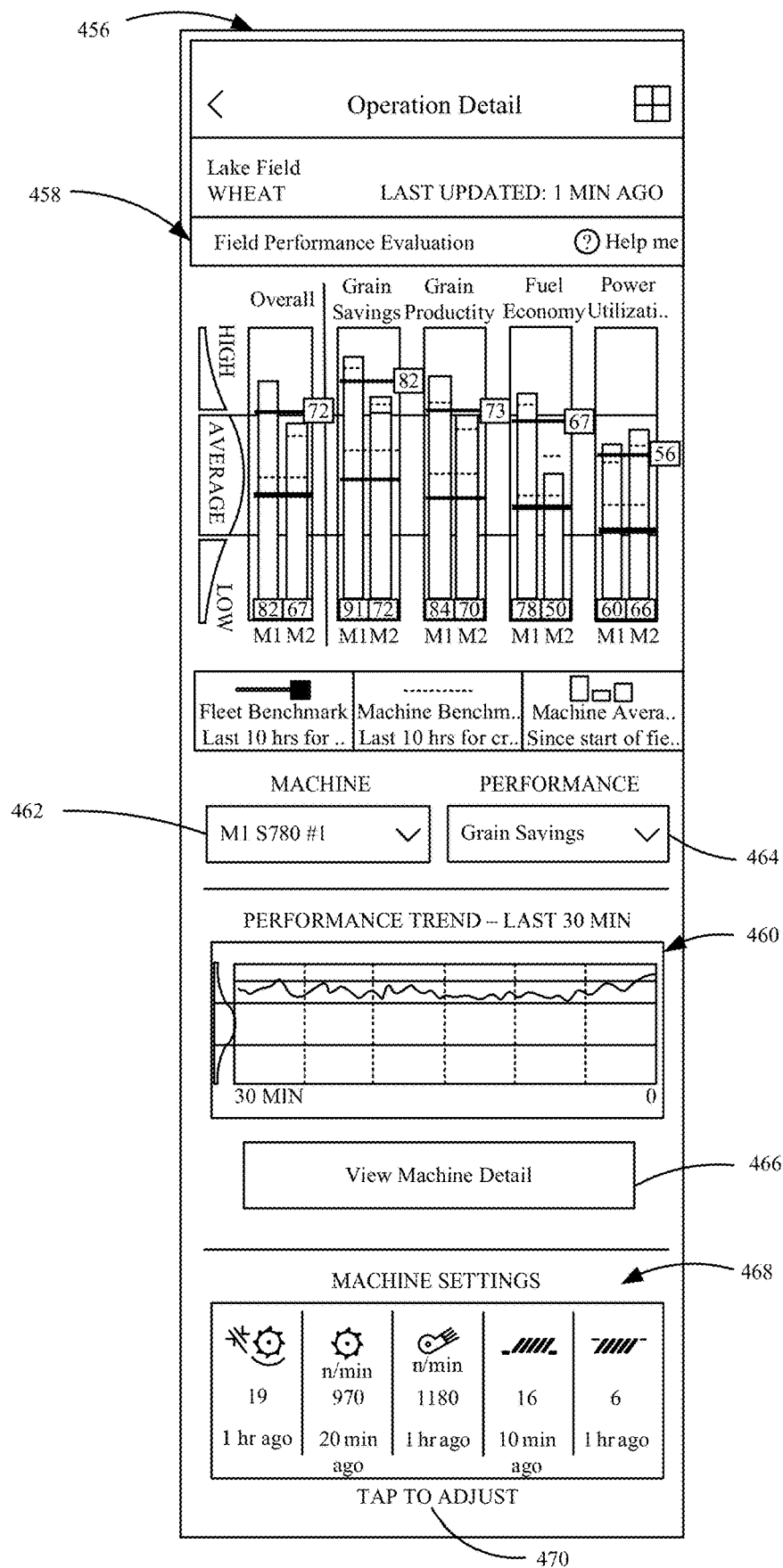
Figure 9C:
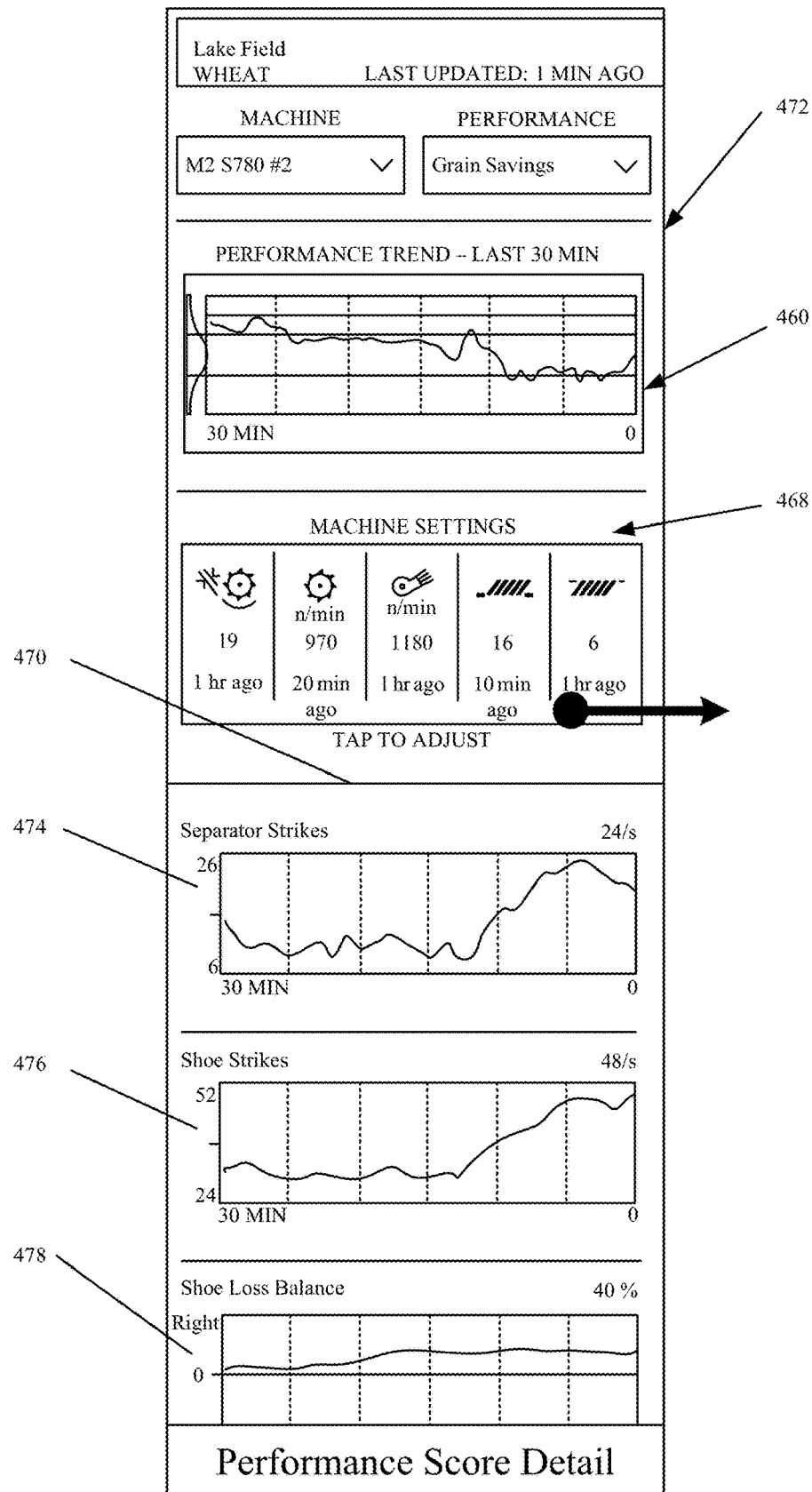

FIG. 9C shows a machine detail display 472 that can be generated in response to the user actuating the machine detail actuator 466. That actuation will be detected by machine detail actuator interaction detector 360 (shown in FIG. 6) which will then control display generator logic 280 to display the machine details illustrated.

It can be seen in FIG. 9C that display 472, in addition to the trend display 460 and the machine settings display 468, can also display the value of one or more sensor signals generated by sensors 246 on the selected combine 100, in near real time. In the example shown in FIG. 9C, the displayed sensor signal values are generated by the separator strike sensor (shown at 474), and the shoe strike sensor (shown at 476) along with the shoe loss signal values generated by the shoe loss sensor (and shown generally at 478). Again, a machine settings adjustment actuator 470 is also displayed on user interface display 472.

Figure 9D:
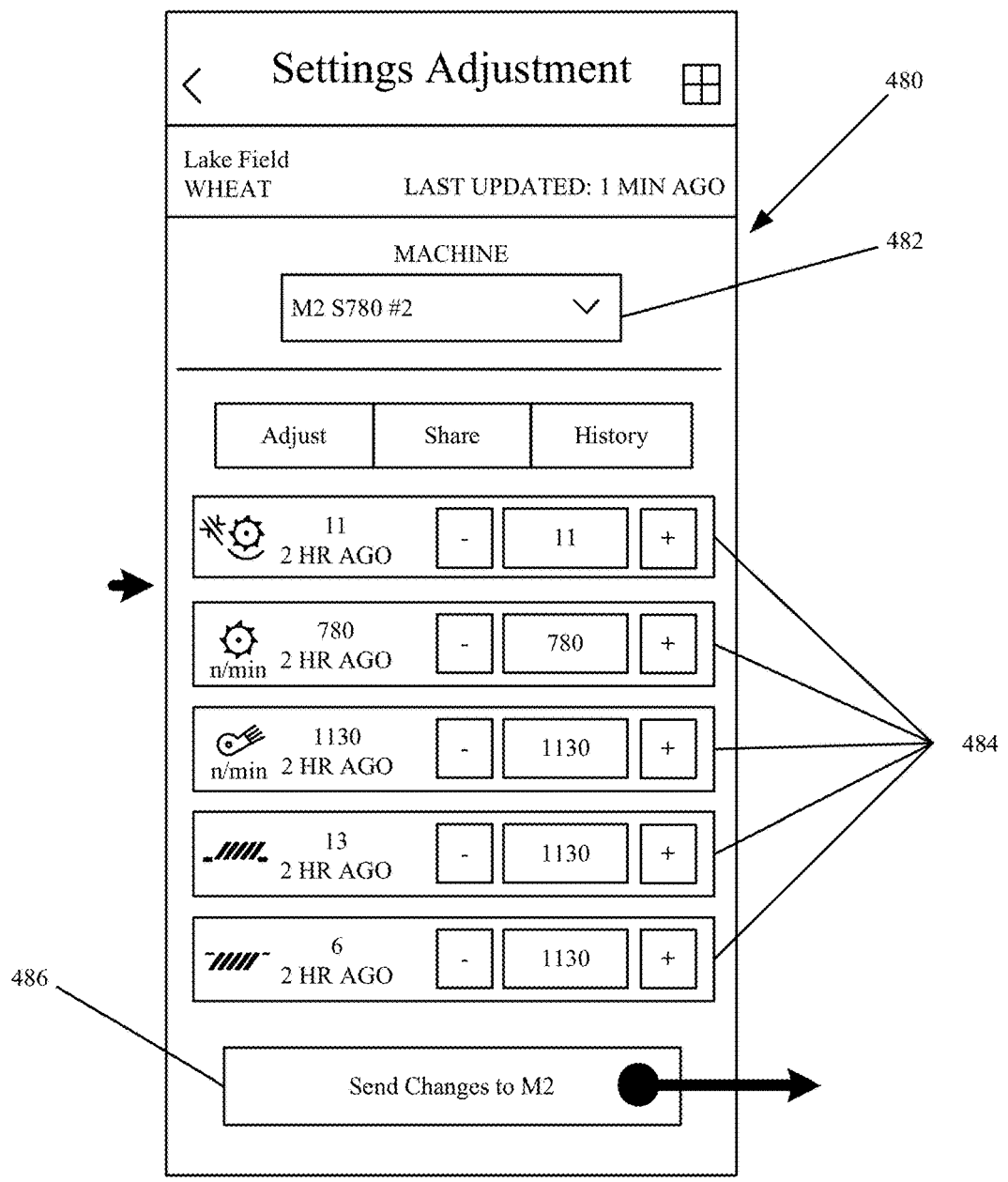

FIG. 9D shows a setting adjustment display 480 that can be displayed if the user actuates the settings adjustment actuator 470 on either user performance display 456 shown in FIG. 9B or the machine detail display 472 shown in FIG. 9C. In the example illustrated, display 480 illustratively includes a machine selector actuator 482 that can be actuated by remote user 220 in order to select one or more machines that the adjustment is to be applied to. It includes adjustment actuators 484, for each of the machine settings that can be adjusted. In the example shown in FIG. 9D, the adjustment actuators 484 include plus and minus actuators that can be actuated by remote user 220 in order to increase or decrease the corresponding setting value, respectively. The actuation of the adjustment actuators shown generally at 484 is detected by adjustment actuator interaction detector 350 (shown in FIG. 6).

When the user 220 is finished making adjustments to the machine settings, the user illustratively actuates a send actuator 486. In response, adjustment request generator 352 (also shown in FIG. 6) generates an adjustment request to the machines selected by selector 482, and uses communication controller logic 346 to control communication system 276 to send an adjustment request to the identified machines. Once the adjustment request has been sent to one or more combines, the adjustment request is processed on those machines as indicated in the flow diagram of FIGS. 10A and 10B, below.

Figure 9E:
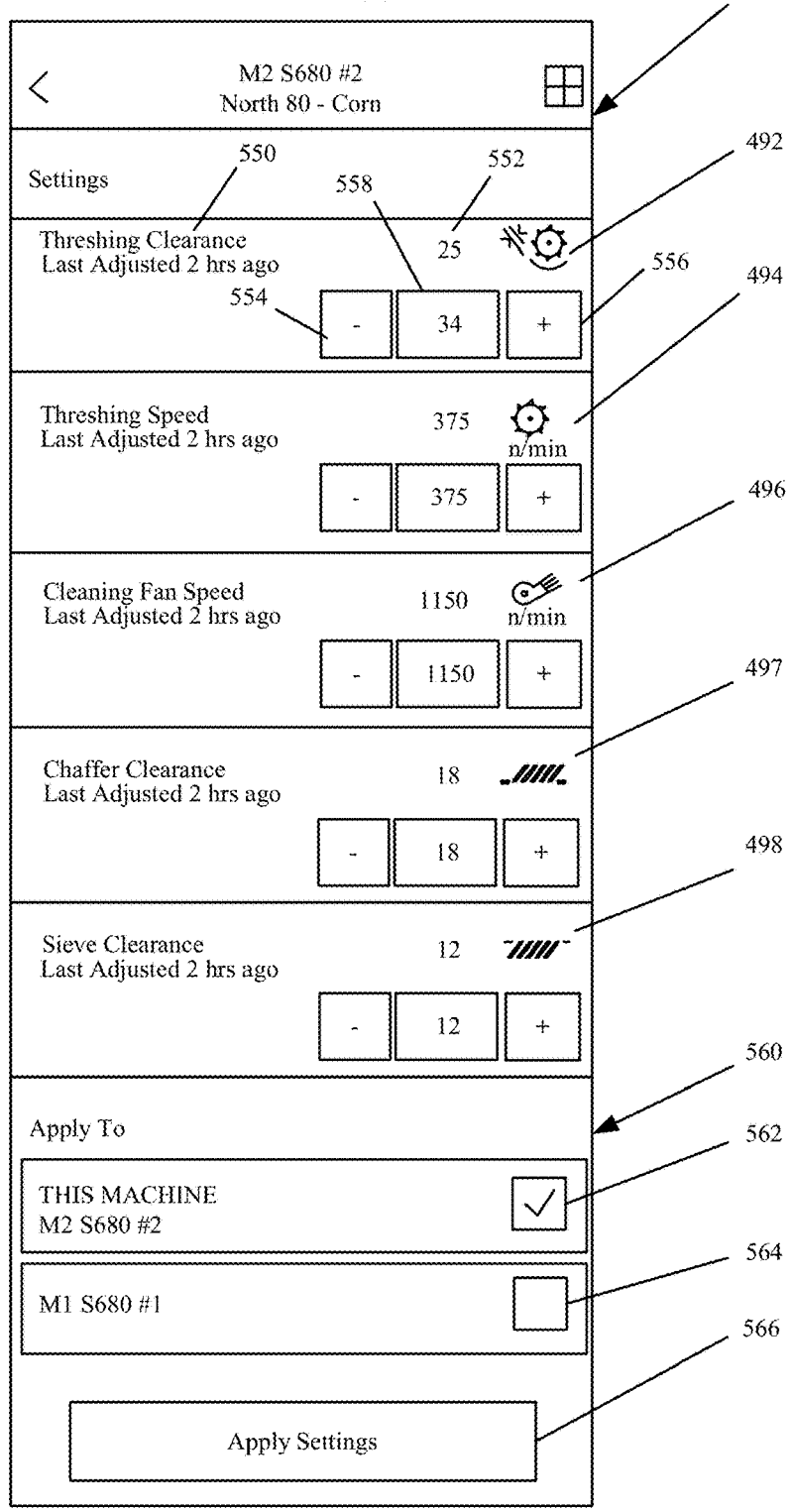

FIG. 9E shows another example of a settings adjustment user interface display 490. It can be seen that user interface display 490 includes a settings display corresponding to each of the machine settings that can be adjusted by remote user 220. For instance, display 492 corresponds to threshing clearance. Display 494 corresponds to threshing rotor speed. Display 496 corresponds to cleaning fan speed. Display 497 corresponds to chaffer clearance, and display 498 corresponds to sieve clearance. Each of the settings displays 492-498 illustratively includes a textual portion describing the text and when it was last adjusted, a current value for the setting, a set of adjustment actuators that allow the value to be increased or decreased, and an adjusted value for the setting after adjustment by remote user 220.

For instance, the threshing clearance setting display 492 includes textual portion 550 that textually describes the setting corresponding to display 492. The textual portion 550 also indicates when it was last adjusted. Settings display 492 also includes a current setting value 552 which shows the current setting value, that is currently set on the combine 100 for the threshing clearance. Setting display 492 also includes a set of actuators 554 and 556 that can be actuated by remote user 220 in order to increase or decrease the setting value, respectively. Display 492 also includes an adjusted value display portion 558 which shows the adjusted value for the setting, after it has been adjusted by remote user 220 using actuators 554 and/or 556.

User interface 490 also illustratively includes a machine selector display portion 560 which illustratively shows a selectable display element corresponding to each of the machines that are operating in the selected field, or for each of the machines that remote user 220 is authorized to access. In the example shown in FIG. 9E, display section 560 includes a selectable display actuator for machine M2, as shown generally at 562, and a selectable display actuator for machine M1, as shown generally at 564. The user can illustratively actuate the selectable actuators in order to select or deselect the machines to which the setting adjustment is to be applied. In the example shown in FIG. 9E, it can be seen that the user has actuated actuator 562 in order to select machine M2, but has not actuated actuator 564 in order to select machine M1.

Once the user has adjusted each of the settings using the adjustment actuators, and once the user has selected the machines that the setting adjustments are to be applied to, remote user 220 can actuate the apply settings actuator 556. In response, adjustment request generator 362 (shown in FIG. 6) generates a settings adjustment request and uses communication system controller logic 346 to control communication system 276 to send the settings adjustment request to all of the machines selected by remote user 220 with selection actuators 562-564. Again, once the settings adjustment request has been sent to the selected machines, the request is processed at each of those machines as described below with respect to FIGS. 10A and 10B.

Figure 10A:
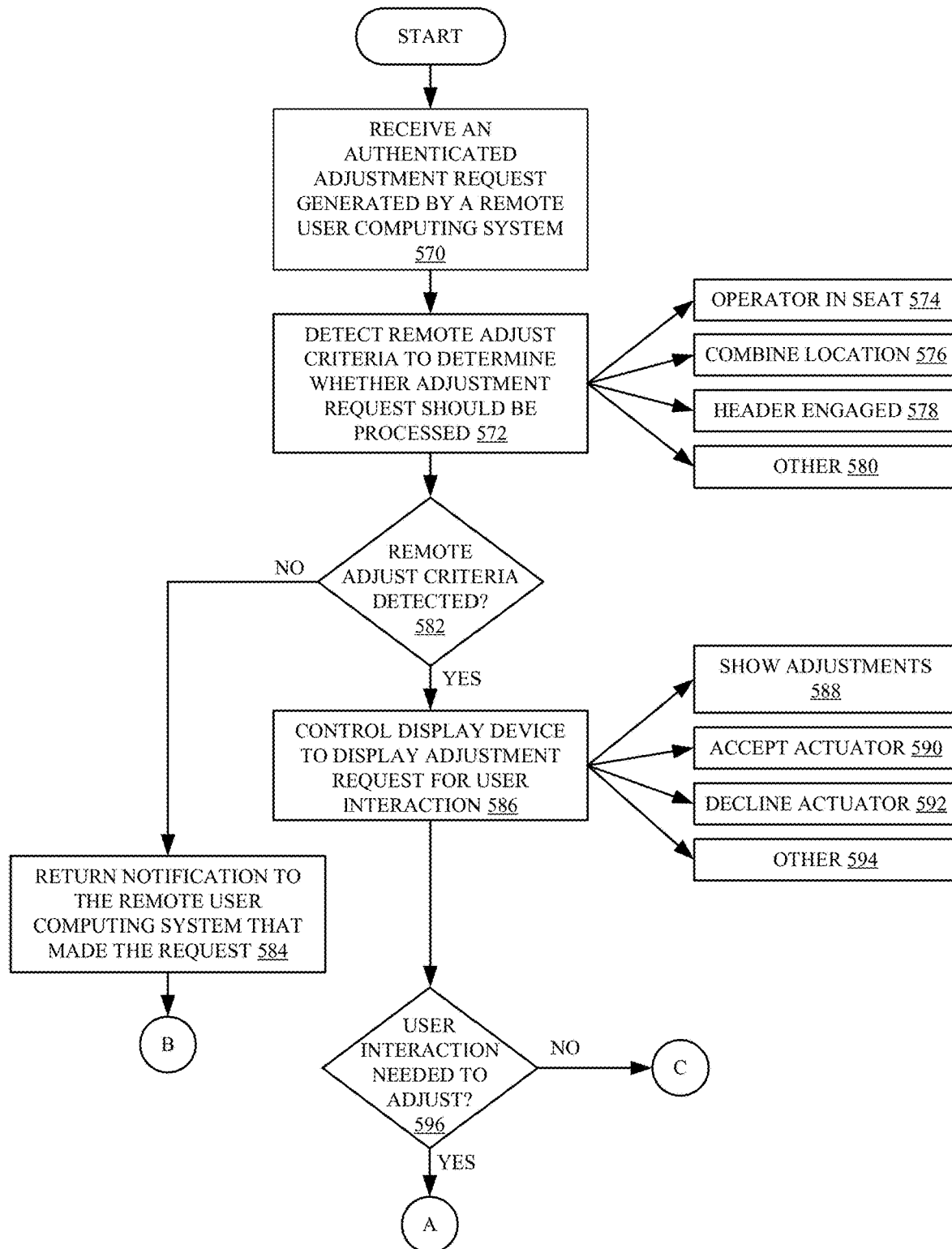
FIGS. 10A and 10B illustrate a flow diagram showing one example of the operation of remote setting adjustment logic on a combine.
Figure 10B:
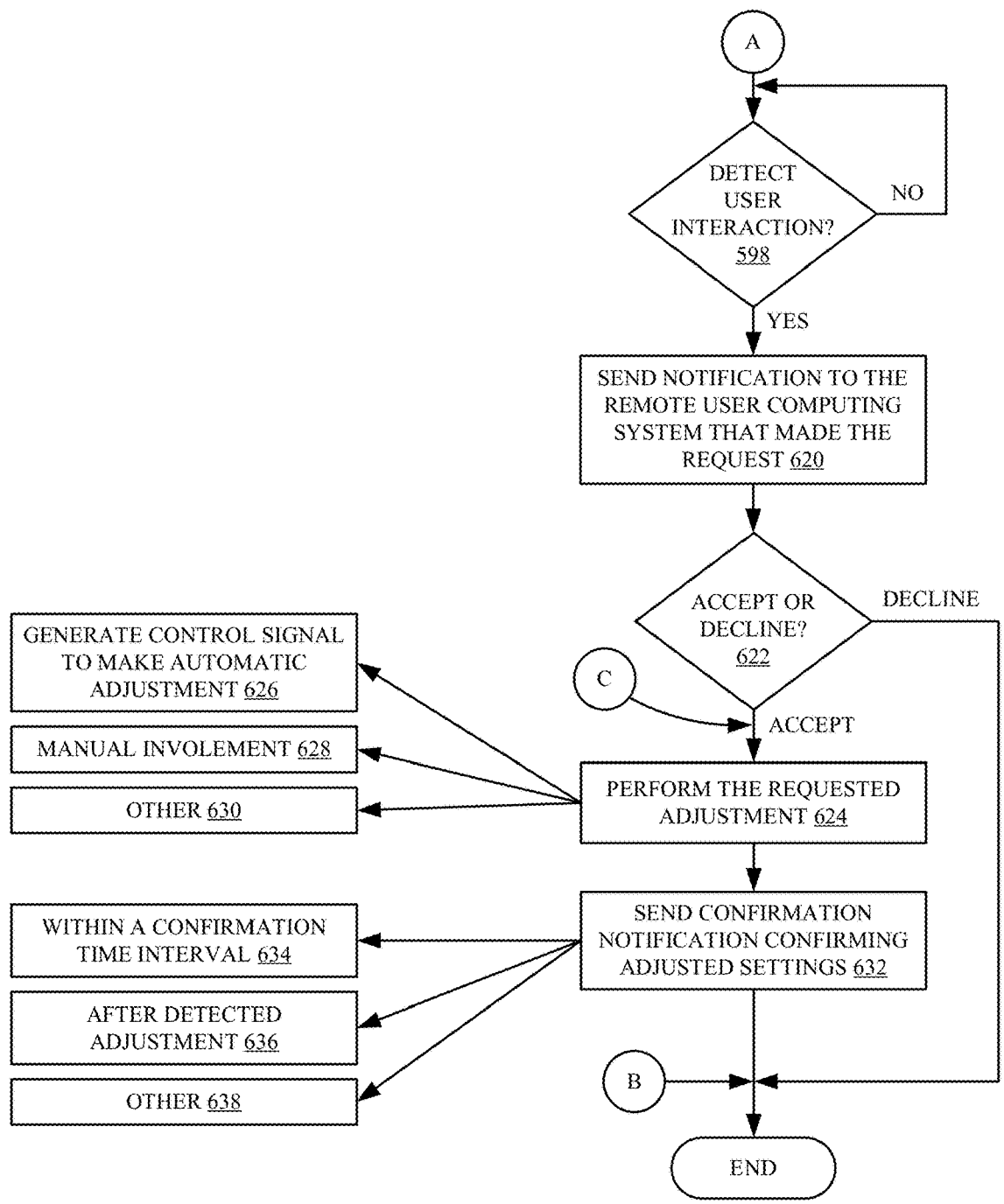

FIGS. 10A and 10B (collectively referred to herein as FIG. 10) show a flow diagram illustrating one example of the operation of remote setting adjustment logic 245 (shown in more detail in FIG. 7) in processing a remote setting adjustment request that is received from a remote user computing system 204. Setting adjustment request input detection logic 380 first receives an authenticated adjustment request generated by a remote user computing system 204. This is indicated by block 570 in the flow diagram of FIG. 10.

Setting adjustment surfacing logic 382 then detects whether remote adjust criteria are present so that the adjustment request should be surfaced for operator 212. This is indicated by block 572. For instance, it may be that the application does not surface adjustment requests if the operator is driving the combine down the road, instead of harvesting in a field. It may be that the application will not surface a request if the combine is idle, or if the operator is out of the operator compartment. These are examples only. However, in those examples, operator presence detector 388 illustratively detects operator presence within the operator compartment. This is indicated by block 574. Machine location detector 387 may detect a current location of combine 100 and determine whether it is indeed within a field, whether it is travelling down the road, etc. Detecting combine location is indicated by block 576. Machine on detector 386 can detect whether the combine is on or off. Harvesting detector 384 may then illustratively detect whether the combine 100 is performing a harvesting operation, such as whether the header is engaged. This is indicated by block 578. Other remote adjust criteria can be detected as well. This is indicated by block 580.

If the remote adjust criteria are not detected, as indicated by block 582, then remote user notification logic 394 (shown in FIG. 7) generates a notification and returns it to the remote user computing system 204 that generated the adjustment request. This is indicated by block 584 in FIG. 10. However, if, at block 582, it is determined that the remote adjust criteria are detected, then operator interaction processing logic 396 illustratively controls user interface logic 230 to display the adjustment request for interaction by operator 212. This is indicated by block 586 in the flow diagram of FIG. 10. In one example, the user interface display shows the adjustments requested as indicated by block 588, along with an accept actuator 590, and a decline actuator 592. A wide variety of other information can be displayed as well. This is indicated by block 594.

Setting adjustment control signal generator logic 392 then determines whether user interaction is needed in order to make the adjustments. For instance, it may be that some combines are configured to automatically make adjustments to the settings, based upon a remote setting adjustment request. It may be that other combines are configured such that setting adjustments will not be automatically made, without the local operator authorizing or accepting those adjustments. Determining whether user interaction is needed to make the adjustments is indicated by block 596 in the flow diagram of FIG. 10. If so, then setting adjustment control signal generator logic 392 determines whether operator interaction processing logic 396 has detected that the operator 212 has interacted with either the accept or decline actuators. This is indicated by block 598 in the flow diagram of FIG. 10. Once the user has interacted (either accepted or declined the requested setting adjustment), remote user notification logic 394 generates a notification indicative of the operator interaction and controls communication system 234 to communicate the notification to remote user computing system 204, where it can be surfaced for remote user 220. Sending the notification to the remote user computing system that made the request is indicated by block 620 in the flow diagram of FIG. 10. The user interaction will either be to accept or decline the requested adjustment. Making this determination is indicated by block 622.

If, at block 622, it is determined that the user has accepted the adjustment request, or if, at block 596, it is determined that no user interaction is needed to make the adjustments, then setting adjustment control signal generator logic 392 generates control signals that are provided to control system 236, and are used to control the controllable subsystems 226 in order to make the identified adjustments. Performing the adjustments is indicated by block 624. Generating control signals to make the adjustments automatically, is indicated by block 626. Making the adjustment based on manual involvement (such as having the user manually accept the adjustment request, or manually make the adjustments), is indicated by block 628. Making the adjustment in other ways (such as in a semi-automatic way) is indicated by block 630.

Once the adjustments are made, then, again, remote user notification logic 394 sends a confirmation notification, confirming that the adjusted settings have been reached. This is indicated by block 632. In one example, the notification is sent within a confirmation time interval so that remote user 220 can determine, within a reasonable time, that the requested adjustments have been made. Sending the notification within a confirmation time interval is indicated by block 634. In another example, the notification can be sent only after the adjustments have been made. This is indicated by block 636. The notification can be sent in other ways as well, and this is indicated by block 638.

Figure 11:
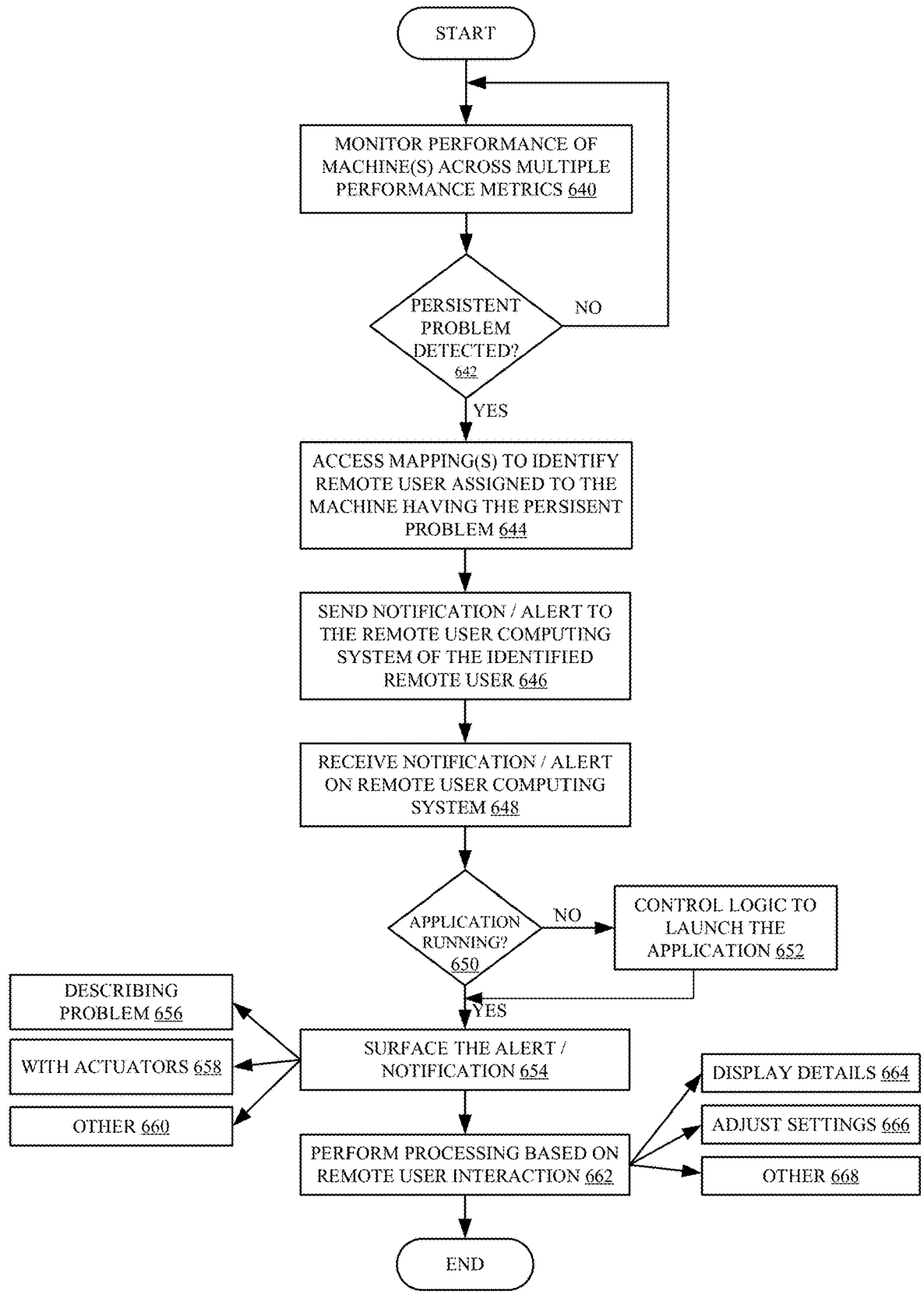
FIG. 11 is a flow diagram illustrating one example of the operation of a remote analytics computing system.

FIG. 11 is a flow diagram illustrating one example of the operation of remote analytics logic 262 in determining whether a particular combine exhibits a persistent problem. Recall, as mentioned above, that remote user 220 may be automatically notified when a persistent problem with a particular combine 100 has been detected. In order to do this, remote analytics logic 262 (shown in more detail in FIG. 4) monitors performance of the various machines, across the multiple performance metrics discussed above. This is indicated by block 640 in the flow diagram of FIG. 11. Persistent problem identifier logic 313 then determines whether a persistent problem exists with one or more of the combines 100. This is indicated by block 642 and it can be done in a wide variety of different ways.

For instance, it may be that one or more of the performance metrics are more important than the others. In that case, the more important performance metrics can be monitored to determine whether the performance metric values for a combine meet a desired threshold value. If not, and if it fails to meet the desired fresh threshold value for a sufficient length of time (which may be fixed or variable), then it may be that persistent problem identifier logic 313 determines that the combine has a persistent problem. It may be that all of the performance metrics are monitored and if any of them fail to meet a desired threshold value, for a threshold amount of time, that a persistent problem is identified. It may be that a persistent problem is identified if certain combinations of metrics fail to meet the threshold value, or in a wide variety of other ways.

If persistent problem identifier logic 313 identifies that a combine has a persistent problem, then it accesses the remote user-to-combine mappings 267 in data store 264 to identify the remote user who is assigned to the machine that is having the persistent problem. This is indicated by block 644. It then uses communication system 266 to send a notification or alert to the remote user computing system of the identified remote user. This is indicated by block 246. The notification or alert may identify the particular combine 100 having the problem, the nature of the problem, it may include the machine settings or recent values for performance metrics taken on the combine, or it can include a wide variety of other information.

The identified remote user computing system 204 then receives the notification or alert, as indicated by block 648. On the remote user computing system, it may be that the application that is used to monitor and adjust machine settings for combines 100 is not running. If it is not running, as indicated by block 650, then the application running logic 274 automatically launches the application, based upon the received notification or alert. This is indicated by block 652.

Once the application is running, it uses user interface logic 278 to display the alert or notification for remote user 220. It can be surfaced in other ways as well, such as using an audible alert, a haptic alert, etc. Surfacing the alert is indicated by block 654.

Again, the alert can describe the nature of the problem as indicated by block 656, it can include actuators for adjusting the machine settings, as indicated by block 658, and it can include a wide variety of other items as indicated by block 660.

Interaction processing logic 282 then performs any processing based on user interactions with the alert. This is indicated by block 662. For instance, the remote user 220 may actuate a machine details actuator to see additional machine details, such as the current (or near real time) sensor signal values, the current (or near real time) performance metric values, various conditions on the combine, etc. Viewing display details in this way is indicated by block 664. The user may actuate actuators to adjust the settings as indicated by block 666. The user may provide other inputs so that user interaction processing logic 282 performs other processing and control steps as well, and this is indicated by block 668.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 12:
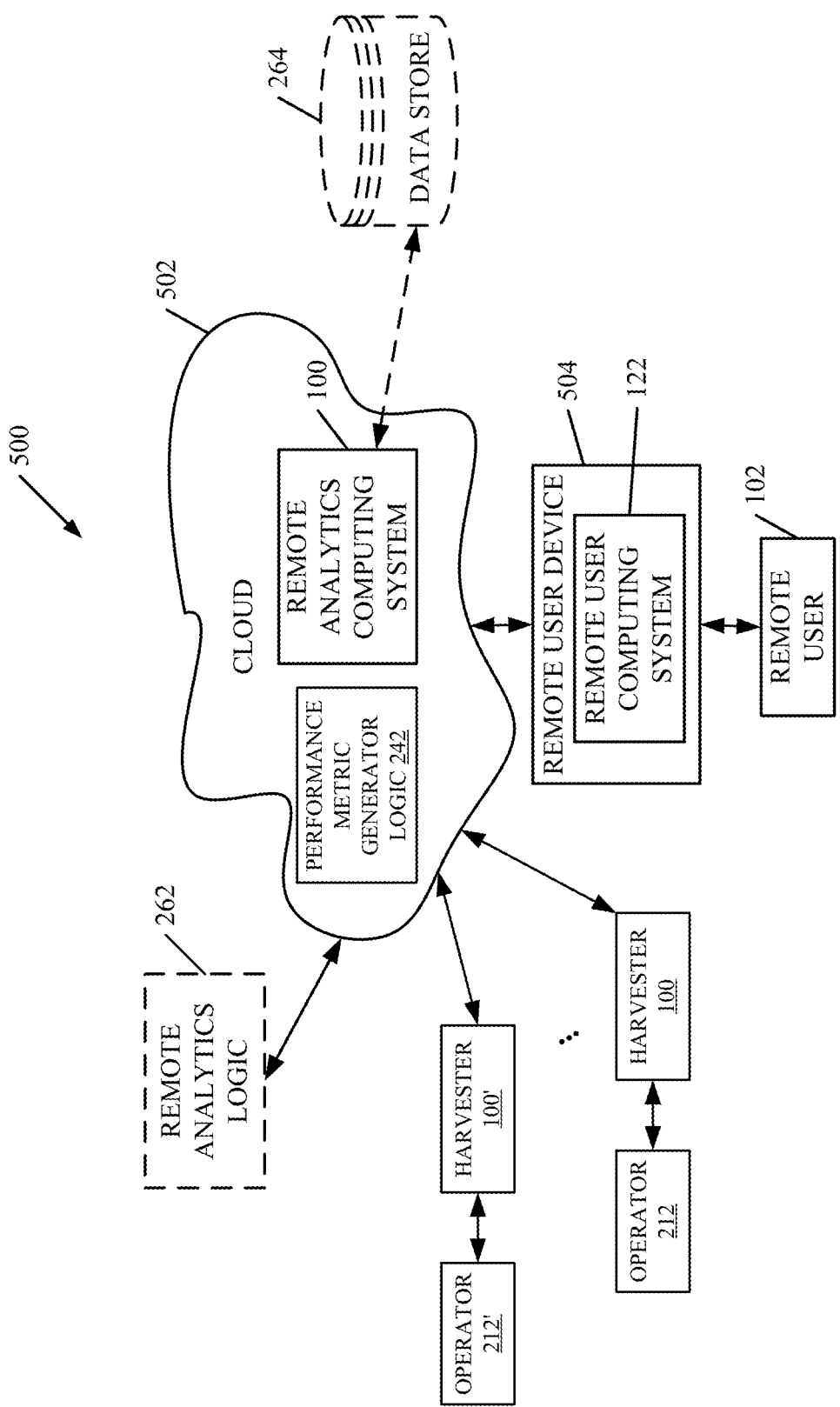
FIG. 12 is a block diagram showing one example of the architecture illustrated in FIG. 2, deployed in a remote server architecture.

FIG. 12 is a block diagram of the architecture 200, shown in FIG. 2, except that it communicates with elements in a remote server architecture 500. In an example, remote server architecture 500 can provide computation, software, data access, and storage services that do not require end-user knowledge of the physical location or configuration of the system that delivers the services. In various embodiments, remote servers can deliver the services over a wide area network, such as the internet, using appropriate protocols. For instance, remote servers can deliver applications over a wide area network and they can be accessed through a web browser or any other computing component. Software or components shown in FIG. 2 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 12, some items are similar to those shown in FIG. 2 and they are similarly numbered. FIG. 12 specifically shows that a plurality of different combines 100-100' can be used, each with its own local operator 212-212'. Also, remote analytics computing system 202 can be located at a remote server location 502. Therefore, combines 100-100' and remote user computing system 204 access those systems through remote server location 502.

FIG. 12 also depicts another example of a remote server architecture. FIG. 12 shows that it is also contemplated that some elements of FIG. 2 are disposed at remote server location 502 while others are not. By way of example, performance metric generator logic 242 can be disposed in system 202. Remote analytics logic 262 and data store 264 can be disposed at a location separate from location 502, and accessed through the remote server at location 502. Regardless of where they are located, they can be accessed directly by combine 100, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the combine comes close to the fuel truck for fueling, the system automatically collects the information from the harvester using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the combine until the combine enters a covered location. The combine, itself, can then send the information to the main network.

It will also be noted that the elements of FIG. 2, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 13:
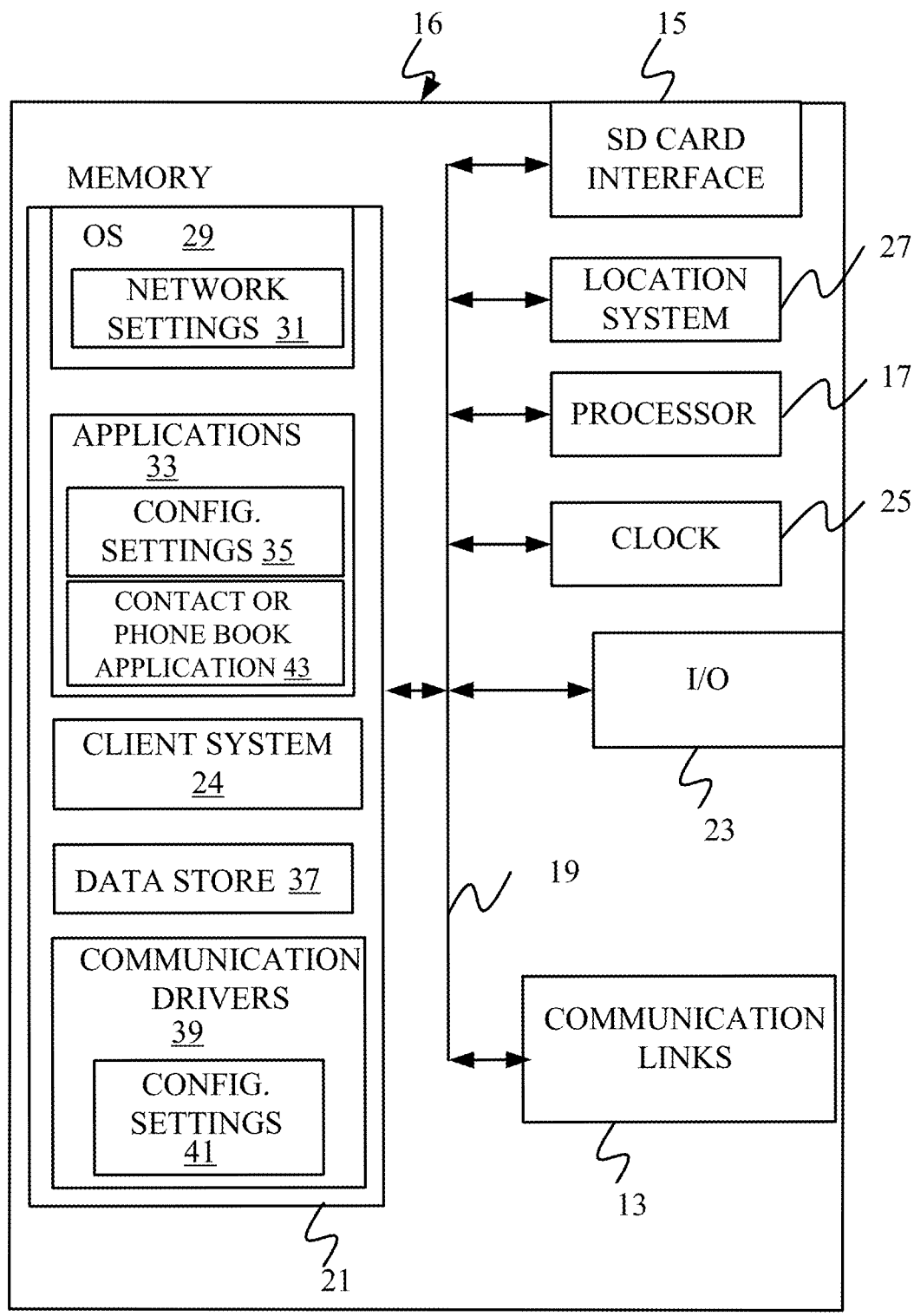
FIGS. 13-15 show examples of mobile devices that can be used in the architectures shown in the previous figures.
Figure 14:
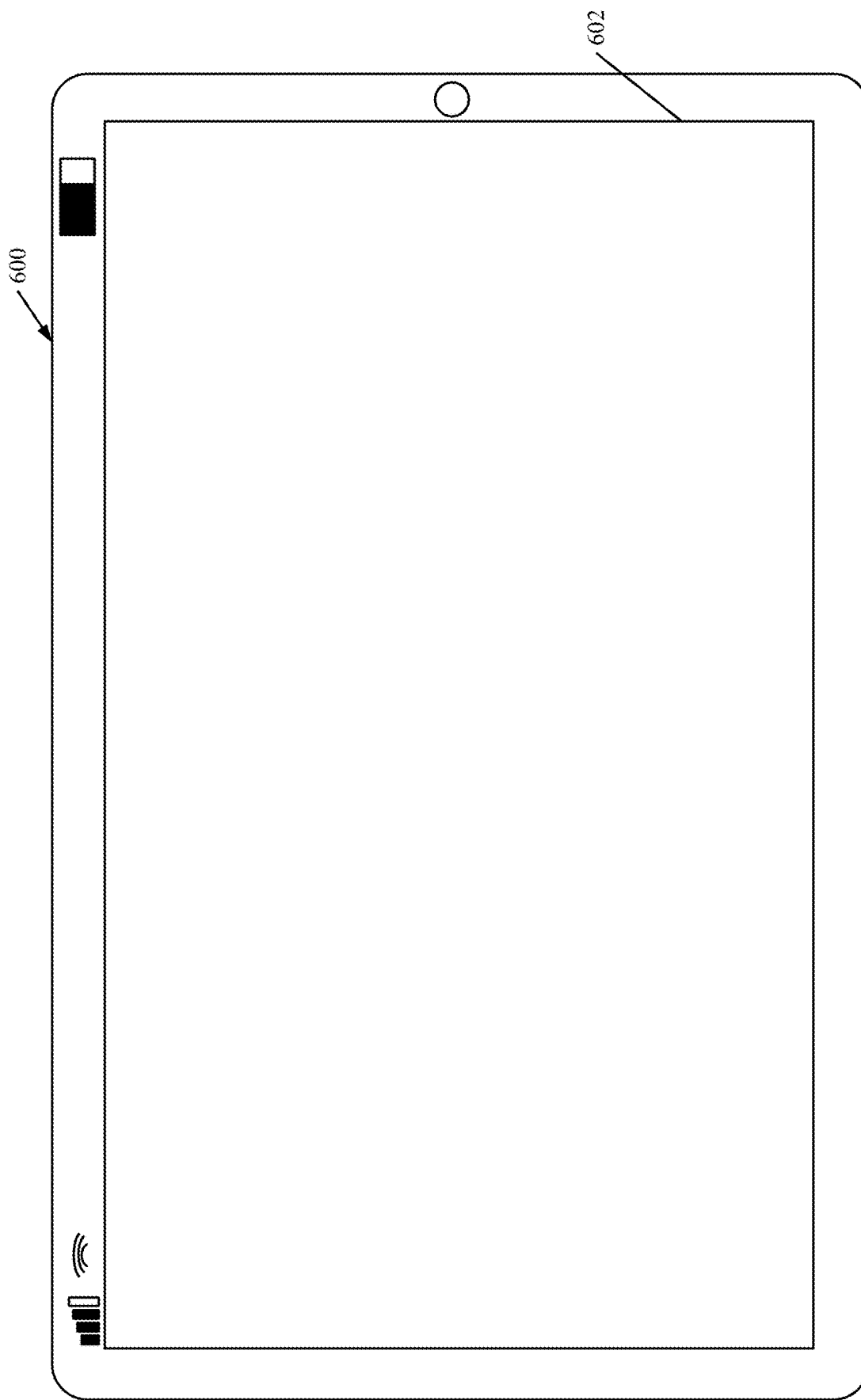
Figure 15:
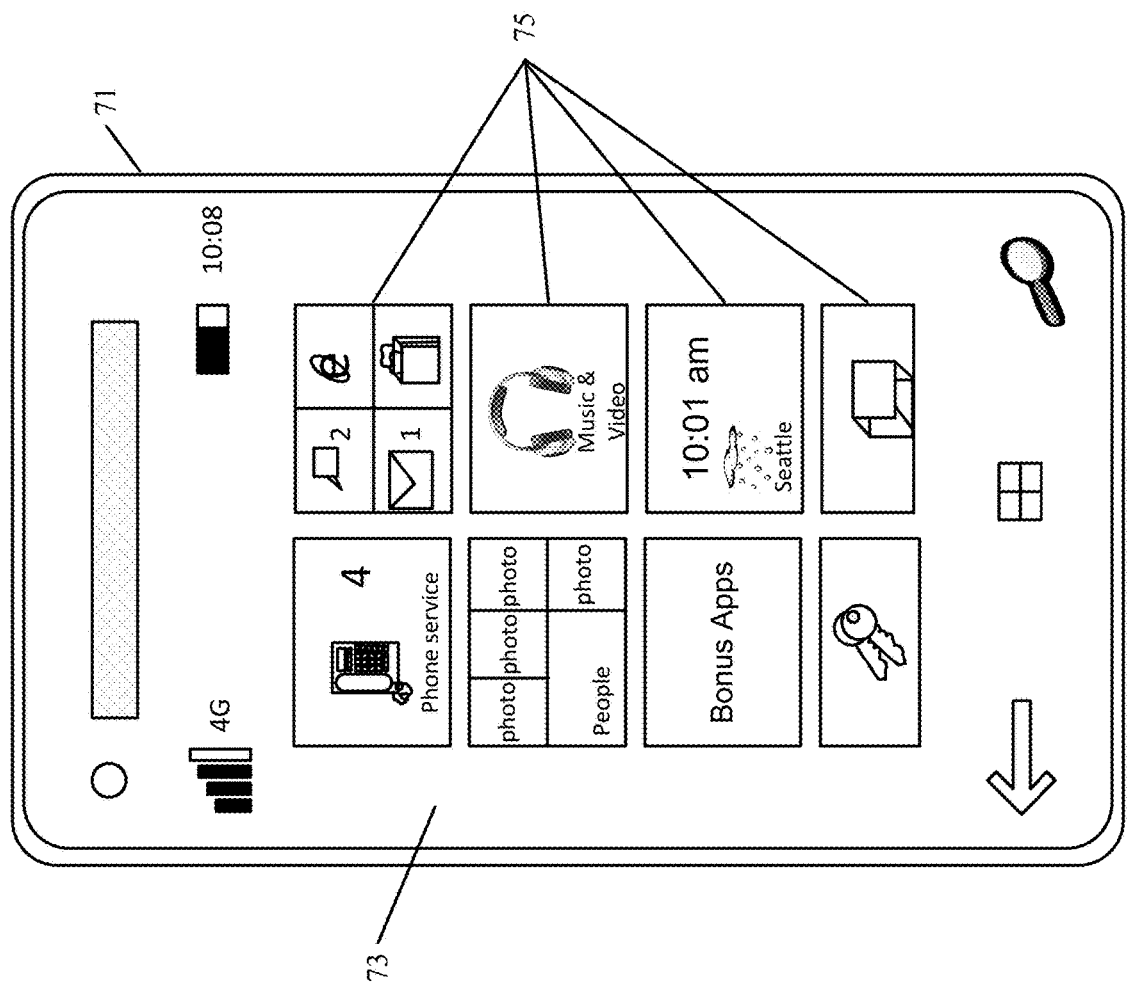

FIG. 13 is a simplified block diagram of one illustrative example of a handheld or mobile computing device that can be used as a user's or client's hand held device 16, in which the present system (or parts of it) can be deployed. For instance, a mobile device can be deployed as remote user computing system 202 in the operator compartment of combine 100 for use in generating, processing, or displaying the information discussed herein and in generating the control interface. FIGS. 14-15 are examples of handheld or mobile devices.

FIG. 13 provides a general block diagram of the components of a client device 16 that can run some components shown in FIG. 2, that interacts with them, or both. In the device 16, a communications link 13 is provided that allows the handheld device to communicate with other computing devices and in some examples provide a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous FIGS.) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 14 shows one example in which device 16 is a tablet computer 600. In FIG. 14, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 15 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 16:
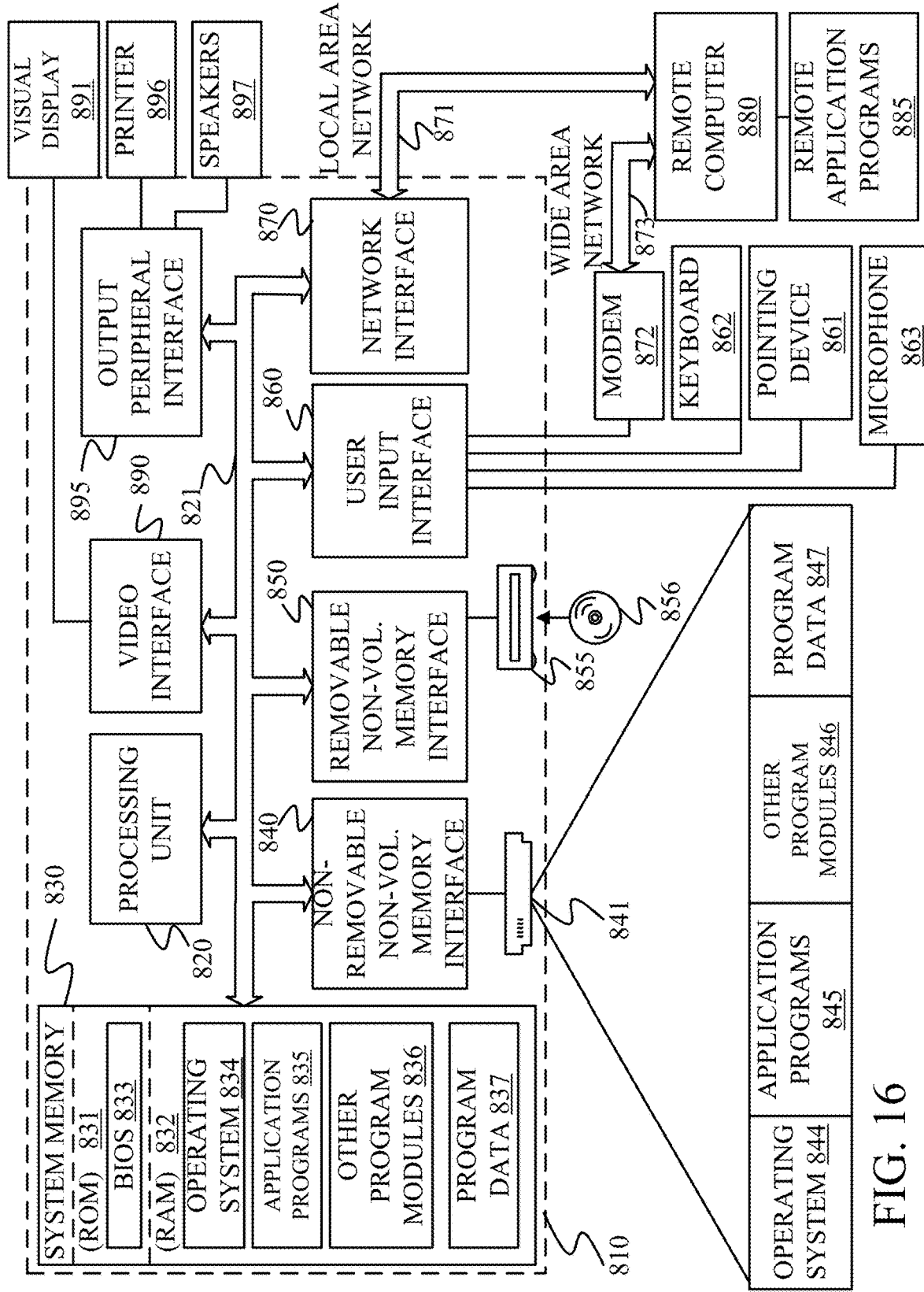
FIG. 16 is a block diagram showing one example of a computing environment that can be used in the architectures shown in the previous figures.

FIG. 16 is one example of a computing environment in which elements of FIG. 2, or parts of it, (for example) can be deployed. With reference to FIG. 16, an example system for implementing some embodiments includes a general-purpose computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 2 can be deployed in corresponding portions of FIG. 16.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 16 illustrates operating system 834, application programs 835, other program modules 836, and program data 837.

The computer 810 may also include other removable/non-removable volatile/nonvolatile computer storage media. By way of example only, FIG. 16 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 16, provide storage of computer readable instructions, data structures, program modules and other data for the computer 810. In FIG. 16, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 16 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is a harvester control system for a harvesting machine, comprising:

a control system that controls a controllable subsystem on the harvesting machine based on a setting;

setting adjustment request detection logic configured to detect an adjustment request from a remote user computing system, the adjustment request including an adjustment to the setting;

setting adjustment surfacing logic configured to surface the adjustment request on a control interface, with a control actuator;

operator interaction processing logic configured to detect operator actuation of the control actuator on the control interface; and setting adjustment control signal generator logic configured to, in response to the operator interaction processing logic detecting operator actuation of the control actuator on the control interface, generate a control signal to adjust the setting to an adjusted setting based on the adjustment in the adjustment request, the control system controlling the controllable subsystem based on the adjusted setting.

Example 2 is the harvester control system of any or all previous examples wherein the setting adjustment surfacing logic is configured to surface the adjusted setting and to surface, as the control actuator, an accept actuator and a decline actuator.

Example 3 is the harvester control system of any or all previous examples wherein the operator interaction processing logic is configured to detect operator actuation of the accept actuator and operator actuation of the decline actuator, the setting adjustment control signal generator being configured to generate the control signal to adjust the setting, based on the adjustment in the adjustment request, in response to the operator interaction processing logic detecting operator actuation of the accept actuator.

Example 4 is the harvester control system of any or all previous examples and further comprising:

remote user notification logic configured to send a notification to the remote user indicating operator actuation of the control actuator.

Example 5 is the harvester control system of any or all previous examples and further comprising:

a communication system, wherein the remote user notification system is configured to control the communication system to send a setting value to the remote user computing system, the setting value being indicative of a value of the setting, after the setting adjustment control signal generator logic generates the control signal to adjust the setting.

Example 6 is the harvester control system of any or all previous examples wherein the control system generates a plurality of different control signals to control a plurality of different controllable subsystems based on a plurality of different settings and wherein the setting adjustment surfacing logic surfaces the adjustment request on the control interface with adjustments to a plurality of different settings.

Example 7 is the harvester control system of any or all previous examples wherein the harvesting machine comprises a combine harvester and wherein the controllable subsystems comprise a threshing subsystem that includes a threshing rotor that is rotatable at a variable rotor speed and a set of concaves, and wherein the setting adjustment surfacing logic surfaces the adjustment request on the control interface with a rotor speed control element comprising a rotor speed settings adjustment with a rotor speed adjustment actuator that is actuatable to adjust the rotor speed setting to an adjusted rotor speed setting based on the rotor speed settings adjustment.

Example 8 is the harvester control system of any or all previous examples wherein the setting adjustment surfacing logic surfaces the adjustment request on the control interface with a concave clearance control element comprising a concave clearance settings adjustment with a concave clearance adjustment actuator that is actuatable to adjust the concave clearance setting to an adjusted concave clearance setting based on the concave clearance setting adjustment.

Example 9 is the harvester control system of any or all previous examples wherein the combine harvester includes a cleaning subsystem that includes a cleaning fan that rotates at a variable fan speed, a sieve that has a controllable sieve opening size and a chaffer that has a controllable chaffer opening size and wherein the setting adjustment surfacing logic surfaces the adjustment request on the control interface with a fan speed control element comprising a fan speed setting adjustment and a fan speed adjustment actuator that is actuatable to adjust the fan speed setting to an adjusted fan speed setting based on the fan speed setting adjustment.

Example 10 is the harvester control system of any or all previous examples wherein the setting adjustment surfacing logic surfaces the adjustment request on the control interface a sieve setting control element comprising a sieve setting adjustment with a sieve setting adjustment actuator that is actuatable to adjust the sieve setting to an adjusted sieve setting based on the sieve setting adjustment.

Example 11 is the harvester control system of any or all previous examples wherein the setting adjustment surfacing logic surfaces the adjustment request on the control interface with a chaffer setting control element comprising a chaffer setting adjustment with a chaffer setting adjustment actuator that is actuatable to adjust the chaffer setting based on the chaffer setting adjustment.

Example 12 is the harvester control system of any or all previous examples wherein the setting adjustment surfacing logic comprises:
a harvesting detector configured to detect whether the harvesting machine is performing a harvesting operation and to surface the adjustment request only if the harvesting machine is performing a harvesting operation.

Example 13 is the harvester control system of any or all previous examples wherein the setting adjustment surfacing logic comprises:
an operator presence detector configured to detect whether an operator is present in an operator's compartment of the harvesting machine and to surface the adjustment request only if the operator is present in the operator's compartment of the harvesting machine.

Example 14 is the harvester control system of any or all previous examples wherein the setting adjustment surfacing logic comprises:
a harvesting machine location detector configured to detect a location of the harvesting machine and to surface the adjustment request based on the location of the harvesting machine.

Example 15 is a method of controlling a harvesting machine, comprising:
controlling a controllable subsystem on the harvesting machine based on a setting;
detecting an adjustment request from a remote user computing system, the adjustment request including an adjustment to the setting;
surfacing the adjustment request on a control interface, with a control actuator;
detecting operator actuation of the control actuator on the control interface;
based on detecting operator actuation of the control actuator on the control interface, generating a control signal to adjust the setting to an adjusted setting based on the adjustment in the adjustment request; and
controlling the controllable subsystem based on the adjusted setting.

Example 16 is the method of any or all previous examples wherein surfacing the adjustment request comprises surfacing the adjusted setting and surfacing, as the control actuator, an accept actuator and a decline actuator, and wherein detecting operator actuation of the control actuator comprises:
detecting operator actuation of the accept actuator and wherein generating the control signal comprises generating the control signal to adjust the setting, based on the adjustment in the adjustment request, in response to detecting operator actuation of the accept actuator.

Example 17 is the method of any or all previous examples and further comprising:
sending a notification to the remote user indicating operator actuation of the control actuator.

Example 18 is the method of any or all previous examples and further comprising:
detecting an adjusted setting value indicative of a value of the setting, after generating the control signal to adjust the setting; and
controlling a communication system to send the detected, adjusted setting value to the remote user computing system.

Example 19 is a harvester, comprising:
a controllable subsystem;
a control system that controls the controllable subsystem based on a setting;
setting adjustment request detection logic configured to detect an adjustment request from a remote user computing system, the adjustment request including an adjustment to the setting;
setting adjustment surfacing logic configured to surface the adjustment request on a control interface, with a control actuator;
operator interaction processing logic configured to detect operator actuation of the control actuator on the control interface;
remote user notification logic configured to send a notification to the remote user indicating operator actuation of the control actuator; and
setting adjustment control signal generator logic configured to, in response to the operator interaction processing logic detecting operator actuation of the control actuator on the control interface, generate a control signal to adjust the setting to an adjusted setting based on the adjustment in the adjustment request, the control system controlling the controllable subsystem based on the adjusted setting.

Example 20 is the harvester of any or all previous examples wherein the operator interaction processing logic is configured to detect operator actuation of an accept actuator on the control interface, the setting adjustment control signal generator being configured to generate the control signal to adjust the setting, based on the adjustment in the adjustment request, in response to the operator interaction processing logic detecting operator actuation of the accept actuator, and further comprising:
a communication system, wherein the remote user notification system is configured to control the communication system to send a setting value to the remote user computing system, the setting value being indicative of a value of the setting, after the setting adjustment control signal generator logic generates the control signal to adjust the setting.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A harvester control system for a harvesting machine, comprising:
    a control system that controls a controllable subsystem on the harvesting machine based on a setting;
    setting adjustment request detection logic configured to detect an adjustment request received from a remote user computing system, that is remote from the harvesting machine, over a communication network, the adjustment request including an adjustment to the setting;
    setting adjustment surfacing logic configured to surface the adjustment request, received from the remote user computing system on a control interface, with a control actuator;
    operator interaction processing logic configured to detect operator actuation of the control actuator on the control interface; and
    setting adjustment control signal generator logic configured to, in response to the operator interaction processing logic detecting operator actuation of the control actuator on the control interface, generate a control signal to adjust the setting to an adjusted setting based on the adjustment in the adjustment request, the control system controlling the controllable subsystem based on the adjusted setting.

2. The harvester control system of claim 1 wherein the control actuator is located in an operator compartment of the harvesting machine.

3. The harvester control system of claim 2 wherein
    the setting adjustment surfacing logic is configured to surface the adjusted setting and to surface, as the control actuator, an accept actuator and a decline actuator; and
    the operator interaction processing logic is configured to detect operator actuation of the accept actuator and operator actuation of the decline actuator, the setting adjustment control signal generator being configured to generate the control signal to adjust the setting, based on the adjustment in the adjustment request, in response to the operator interaction processing logic detecting operator actuation of the accept actuator.

4. The harvester control system of claim 3 and further comprising:
    remote user notification logic configured to send a notification to the remote user indicating operator actuation of the control actuator.

5. The harvester control system of claim 4 and further comprising:
    a communication system, wherein the remote user notification system is configured to control the communication system to send a setting value to the remote user computing system, the setting value being indicative of a value of the setting, after the setting adjustment control signal generator logic generates the control signal to adjust the setting.

6. The harvester control system of claim 5 wherein the control system generates a plurality of different control signals to control a plurality of different controllable subsystems based on a plurality of different settings and wherein the setting adjustment surfacing logic surfaces the adjustment request on the control interface with adjustments to a plurality of different settings.

7. The harvester control system of claim 6 wherein the harvesting machine comprises a combine harvester and wherein the controllable subsystems comprise a threshing subsystem that includes a threshing rotor that is rotatable at a variable rotor speed and a set of concaves, and wherein the setting adjustment surfacing logic surfaces the adjustment request on the control interface with a rotor speed control element comprising a rotor speed settings adjustment with a rotor speed adjustment actuator that is actuatable to adjust the rotor speed setting to an adjusted rotor speed setting based on the rotor speed settings adjustment.

8. The harvester control system of claim 7 wherein the setting adjustment surfacing logic surfaces the adjustment request on the control interface with a concave clearance control element comprising a concave clearance settings adjustment with a concave clearance adjustment actuator that is actuatable to adjust the concave clearance setting to an adjusted concave clearance setting based on the concave clearance setting adjustment.

9. The harvester control system of claim 8 wherein the combine harvester includes a cleaning subsystem that includes a cleaning fan that rotates at a variable fan speed, a sieve that has a controllable sieve opening size and a chaffer that has a controllable chaffer opening size and wherein the setting adjustment surfacing logic surfaces the adjustment request on the control interface with a fan speed control element comprising a fan speed setting adjustment and a fan speed adjustment actuator that is actuatable to adjust the fan speed setting to an adjusted fan speed setting based on the fan speed setting adjustment.

10. The harvester control system of claim 9 wherein the setting adjustment surfacing logic surfaces the adjustment request on the control interface a sieve setting control element comprising a sieve setting adjustment with a sieve setting adjustment actuator that is actuatable to adjust the sieve setting to an adjusted sieve setting based on the sieve setting adjustment.

11. The harvester control system of claim 10 wherein the setting adjustment surfacing logic surfaces the adjustment request on the control interface with a chaffer setting control element comprising a chaffer setting adjustment with a chaffer setting adjustment actuator that is actuatable to adjust the chaffer setting based on the chaffer setting adjustment.

12. The harvester control system of claim 1 wherein the setting adjustment surfacing logic comprises:
    a harvesting detector configured to detect whether the harvesting machine is performing a harvesting operation and to surface the adjustment request only if the harvesting machine is performing a harvesting operation.

13. The harvester control system of claim 12 wherein the setting adjustment surfacing logic comprises:
    an operator presence detector configured to detect whether an operator is present in an operator's compartment of the harvesting machine and to surface the adjustment request only if the operator is present in the operator's compartment of the harvesting machine.

14. The harvester control system of claim 12 wherein the setting adjustment surfacing logic comprises:
    a harvesting machine location detector configured to detect a location of the harvesting machine and to surface the adjustment request based on the location of the harvesting machine.

15. A method of controlling a harvesting machine, the method comprising:
- controlling a controllable subsystem on the harvesting machine based on a setting;
- detecting an adjustment request from a remote user computing system, the adjustment request including an adjustment to the setting; surfacing the adjustment request on a control interface, with a control actuator, when a harvesting detector detects that the harvesting machine is performing a harvesting operation;
- detecting operator actuation of the control actuator on the control interface;
- based on detecting operator actuation of the control actuator on the control interface, generating a control signal to adjust the setting to an adjusted setting based on the adjustment in the adjustment request; and
- controlling the controllable subsystem based on the adjusted setting.

16. The method of claim 15 wherein surfacing the adjustment request comprises surfacing the adjusted setting and surfacing, as the control actuator, an accept actuator and a decline actuator, and wherein detecting operator actuation of the control actuator comprises:
- detecting operator actuation of the accept actuator and wherein generating the control signal comprises generating the control signal to adjust the setting, based on the adjustment in the adjustment request, in response to detecting operator actuation of the accept actuator.

17. The method of claim 16 and further comprising:
- sending a notification to the remote user indicating operator actuation of the control actuator.

18. The method of claim 17 and further comprising:
- detecting an adjusted setting value indicative of a value of the setting, after generating the control signal to adjust the setting; and
- controlling a communication system to send the detected, adjusted setting value to the remote user computing system.

19. A harvester, comprising:
- a communication system;
- a controllable subsystem;
- a control system that controls the controllable subsystem based on a setting;
- setting adjustment request detection logic configured to detect an adjustment request from a remote user computing system, the adjustment request including an adjustment to the setting;
- setting adjustment surfacing logic configured to surface the adjustment request on a control interface, with an accept actuator;
- operator interaction processing logic configured to detect operator actuation of the accept actuator on the control interface;
- remote user notification logic configured to send a notification to the remote user indicating operator actuation of the control actuator;
- setting adjustment control signal generator logic configured to, in response to the operator interaction processing logic detecting operator actuation of the accept actuator on the control interface, generate a control signal to adjust the setting to an adjusted setting based on the adjustment in the adjustment request, the control system controlling the controllable subsystem based on the adjusted setting; and
- wherein the remote user notification system is configured to control the communication system to send a setting value to the remote user computing system, the setting value being indicative of a value of the setting, after the setting adjustment control signal generator logic generates the control signal to adjust the setting.

20. The harvester of claim 19 wherein the control system generates a plurality of different control signals to control a plurality of different controllable subsystems based on a plurality of different settings and wherein the setting adjustment surfacing logic surfaces the adjustment request on the control interface with adjustments to a plurality of different settings.

\* \* \* \* \*

UNITED STATES PATENT AND TRADEMARK OFFICE
CERTIFICATE OF CORRECTION

| | |
|---|---|
| PATENT NO. | : 10,694,668 B2 |
| APPLICATION NO. | : 15/626972 |
| DATED | : June 30, 2020 |
| INVENTOR(S) | : Sebastian Blank and Bhanu Kiran Reddy Palla |

It is certified that error appears in the above-identified patent and that said Letters Patent is hereby corrected as shown below:

In the Claims

Column 27 Claim 5, Line 58 delete "system" insert --logic--.

Column 30 Claim 19, Line 26 delete "system" insert --logic--.

Signed and Sealed this
First Day of October, 2024

Katherine Kelly Vidal
*Director of the United States Patent and Trademark Office*